US012041104B2

(12) United States Patent
Hamza et al.

(10) Patent No.: US 12,041,104 B2
(45) Date of Patent: Jul. 16, 2024

(54) METHODS AND APPARATUS FOR ADAPTIVE STREAMING OF POINT CLOUDS

(71) Applicant: VID SCALE, INC., Wilmington, DE (US)

(72) Inventors: Ahmed Hamza, Montreal (CA); Yong He, San Diego, CA (US)

(73) Assignee: VID SCALE, INC., Wilmington, DE (US)

( * ) Notice: Subject to any disclaimer, the term of this patent is extended or adjusted under 35 U.S.C. 154(b) by 20 days.

(21) Appl. No.: 17/436,891

(22) PCT Filed: Mar. 6, 2020

(86) PCT No.: PCT/US2020/021431
§ 371 (c)(1),
(2) Date: Sep. 7, 2021

(87) PCT Pub. No.: WO2020/185578
PCT Pub. Date: Sep. 17, 2020

(65) Prior Publication Data
US 2022/0166814 A1 May 26, 2022

Related U.S. Application Data

(60) Provisional application No. 62/815,725, filed on Mar. 8, 2019, provisional application No. 62/866,043, filed
(Continued)

(51) Int. Cl.
*H04L 65/61* (2022.01)
*H04L 67/02* (2022.01)
*H04N 19/70* (2014.01)

(52) U.S. Cl.
CPC .............. *H04L 65/61* (2022.05); *H04L 67/02* (2013.01); *H04N 19/70* (2014.11)

(58) Field of Classification Search
CPC .......... H04L 65/61; H04L 67/02; H04N 19/70
See application file for complete search history.

(56) References Cited

U.S. PATENT DOCUMENTS 9,125,073 B2    9/2015  Oyman et al.
2003/0229900 A1  12/2003  Reisman
(Continued)

FOREIGN PATENT DOCUMENTS

CN    104412253 A    3/2015
CN    105474650 A    4/2016
(Continued)

OTHER PUBLICATIONS

"Digital Video Broadcasting (DVB); MPEG-DASH Profile for Transport of ISO BMFF Based DVB Services over IP Based Networks," 2018. (Year: 2018).*
(Continued)

*Primary Examiner* — Andrew C Georgandellis
(74) *Attorney, Agent, or Firm* — Flaster Greenberg P.C.

(57) ABSTRACT

Methods, apparatus, and systems directed to adaptive streaming of V-PCC (Video-based Point Cloud Compression) data using an adaptive HTTP streaming protocol, such as MPEG DASH. A method includes signaling the point cloud data of the point cloud in a DASH MPD including: a main AdaptationSet for the point cloud, including at least (1) a @codecs attribute that is set to a unique value signifying that the corresponding AdaptationSet corresponds to V-PCC data and (2) an initialization segment containing at least one V-PCC sequence parameter set for a representation of the point cloud; and a plurality of component AdaptationSets, each corresponding to one of the V-PCC components and including at least (1) a VPCCComponent descriptor identifying a type of the corresponding V-PCC component and (2)
(Continued)

at least one property of the V-PCC component; and transmitting the DASH bitstream over the network.

20 Claims, 8 Drawing Sheets

Related U.S. Application Data on Jun. 25, 2019, provisional application No. 62/908,630, filed on Oct. 1, 2019.

(56) References Cited

U.S. PATENT DOCUMENTS

| | | |
|---|---|---|
| 2012/0016965 A1* | 1/2012 | Chen ................ H04N 21/23439 709/219 |
| 2015/0172344 A1 | 6/2015 | Bae |
| 2015/0271237 A1 | 9/2015 | Stockhammer |
| 2016/0105728 A1 | 4/2016 | Schmidmer et al. |
| 2017/0094262 A1 | 3/2017 | Peterson et al. |
| 2018/0324240 A1 | 11/2018 | Fleureau et al. |
| 2020/0013168 A1 | 1/2020 | Seshita et al. |
| 2020/0202608 A1* | 6/2020 | Mekuria ................ H04L 65/80 |
| 2021/0142522 A1 | 5/2021 | Li et al. |
| 2022/0166814 A1* | 5/2022 | Hamza ................ H04N 19/70 |
| 2022/0353539 A1* | 11/2022 | Huang ................ H04N 19/70 |

FOREIGN PATENT DOCUMENTS

| | | |
|---|---|---|
| CN | 106973569 A | 7/2017 |
| CN | 108810571 A | 11/2018 |
| CN | 108833927 A | 11/2018 |
| KR | 2015-0070568 A | 6/2015 |
| WO | WO 2015/009723 A1 | 1/2015 |
| WO | WO 2015/148519 A1 | 10/2015 |
| WO | WO 2018/150933 A1 | 8/2018 |

OTHER PUBLICATIONS

Schwarz et al., "Emerging MPEG Standards for Point Cloud Compression," 2018. (Year: 2018).*
Hosseini et al., "Dynamic Adaptive Point Cloud Streaming," Jun. 2018. (Year: 2018).*
Takahashi, Ryohei, et al., Clarification on PCC Category 2 Bitstream from System Technology Aspect, Sony Corporation No. M43491, Jul. 2018, 2 pages.
Takahashi, Ryohei, et al., On V-PCC Single Track Encapsulation, Sony Corporation, M46006, Jan. 2019, XP030214452, 10 pages.
Aksu, Emre, et al., PCC On High Level Syntax of V-PCC, Nokia, No. M44727, Oct. 4, 2018, XP030192423, 5 pages.
Tulvan, et al., Use Cases for Point Cloud Compression (Pcc), N16331, Juen 2016, 8 pages.
Information technology—Coded Representation of Immersive Media—Part 5: Video-based Point Cloud Compression, N18180, Jan. 2019, 102 pages.
Information technology—Dynamic adaptive streaming over HTTP (DASH)—Part 1: Media presentation description and segment formats, N18312, Jan. 2019, 222 pages.
Information technology—Coded representation of immersive media—Part 10: Carriage of Point Cloud Data, N18266, Jan. 2019, 14 pages.
Information technology—Coding of Audio-visual objects Part 12: ISO base media file format, 14496, Feb. 2015, 299 pages.
Schwarz, Sebastian, et al., "Emerging MPEG Standards for Point Cloud Compression", IEEE Journal on Emerging and Selected Topics in Circuits and Systems, vol. 9, No. 1, Mar. 2019, 16 pages.

* cited by examiner

METHODS AND APPARATUS FOR ADAPTIVE STREAMING OF POINT CLOUDS

CROSS REFERENCE TO RELATED APPLICATIONS

This application is the National Stage entry under 35 U.S.C. § 371 of Patent Cooperation Treaty Application PCT/US2020/021431, filed 6 Mar. 2020 and claims the benefit of U.S. Provisional Application No. 62/815,725 filed 8 Mar. 2019; U.S. Provisional Application No. 62/866,043 filed 25 Jun. 2019 and U.S. Provisional Application No. 62/908,630 filed 1 Oct. 2019, the contents of each of which are incorporated by reference herein.

BACKGROUND

High-quality 3D point clouds have recently emerged as an advanced representation of immersive media. A point cloud consists of a set of points represented in the 3D space using coordinates indicating the location of each point along with one or more attributes, such as the color associated with each point, transparency, time of acquisition, reflectance of laser or material property, etc. The data for creating point clouds can be captured in a number of ways. For example, one technique for capturing point clouds is using multiple cameras and depth sensors. Light Detection and Ranging (LiDAR) laser scanners are also commonly used for capturing point clouds. The number of points required in order to realistically reconstruct objects and scenes using point clouds is on the order of millions (or even billions). Therefore, efficient representation and compression is essential for storing and transmitting point cloud data.

Recent advances in the technologies of capturing and rendering 3D points have led to novel applications in the areas of tele-presence, virtual reality, and large-scale dynamic 3D maps. The 3D Graphics subgroup of ISO/IEC JTC1/SC29/WG11 Moving Picture Experts Group (MPEG) is currently working on the development of two 3D point cloud compression (PCC) standards: a geometry-based compression standard for static point clouds (point clouds for stationary objects), and a video-based compression standard for dynamic point clouds (point clouds for moving objects). The goal of these standards is to support efficient and interoperable storage and transmission of 3D point clouds. Among the requirements of these standards is to support lossy and/or lossless coding of point cloud geometry coordinates and attributes.

BRIEF DESCRIPTION OF THE DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein.

DETAILED DESCRIPTION

Exemplary Systems in which Embodiments May be Implemented

Figure 1A:
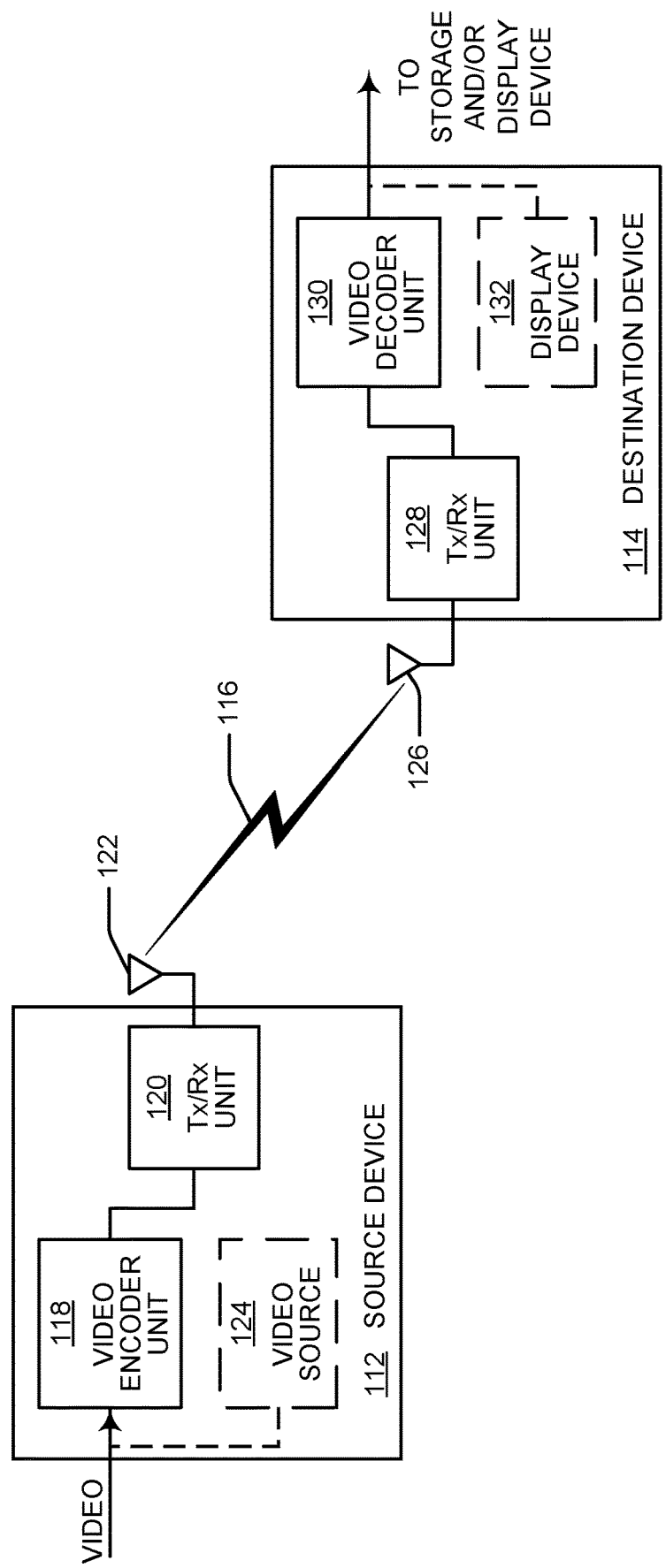
FIG. 1A is a block diagram illustrating an example video encoding and decoding system in which one or more embodiments may be carried out and/or implemented.

FIG. 1A is a block diagram illustrating an example video encoding and decoding system 100 in which one or more embodiments may be carried out and/or implemented. The system 100 may include a source device 112 that may transmit encoded video information to a destination device 114 via a communication channel 116.

The source device 112 and/or destination device 114 may be any of a wide range of devices. In some representative embodiments, the source device 112 and/or the destination device 114 may include wireless transmit and/or receive units (WTRUs), such as wireless handsets or any wireless devices that can communicate video information over the communication channel 116, in which case, communication channel 116 includes a wireless link. The methods, apparatuses and systems described, disclosed or otherwise provided explicitly, implicitly and/or inherently (collectively "provided") herein, however, are not necessarily limited to wireless applications or settings. For example, these techniques may apply to over-the-air television broadcasts, cable television transmissions, satellite television transmissions, Internet video transmissions, encoded digital video that is encoded onto a storage medium, and/or other scenarios. The communication channel 116 may include and/or may be any combination of wireless or wired media suitable for transmission of encoded video data.

The source device 112 may include a video encoder unit 118, a transmit and/or receive (Tx/Rx) unit 120 and/or a Tx/Rx element 122. As shown, the source device 112 may include a video source 124. The destination device 114 may include a Tx/RX element 126, a Tx/Rx unit 128 and/or a video decoder unit 130. As shown, the destination device 114 may include a display device 132. Each of the Tx/Rx units 120, 128 may be or may include a transmitter, a receiver or a combination of a transmitter and a receiver (e.g., a transceiver or transmitter-receiver). Each of the Tx/Rx elements 122, 126 may be, for example, an antenna. In accordance with this disclosure, the video encoder unit 118 of the source device 112 and/or the video decoder unit 130 of the destination device 114 may be configured and/or adapted (collectively "adapted") to apply the coding techniques provided herein.

The source and destination devices 112, 114 may include other elements/components or arrangements. For example, the source device 112 may be adapted to receive video data from an external video source. The destination device 114 may interface with an external display device (not shown) and/or may include and/or use the (e.g., integrated) display device 132. In some embodiments, a data stream generated by the video encoder unit 118 may be conveyed to other devices without modulating the data onto a carrier signal, such as by direct digital transfer and the other devices may or may not modulate the data for transmission.

The techniques provided herein may be performed by any digital video encoding and/or decoding device. Although generally the techniques provided herein are performed by separate video encoding and/or video decoding devices, the techniques may also be performed by a combined video encoder/decoder, typically referred to as a "CODEC." The techniques provided herein may also be performed by a video preprocessor or the like. The source device 112 and the destination device 114 are merely examples of such coding devices in which the source device 112 may generate (and/or may receive video data and may generate) the encoded video information for transmission to the destination device 114. In some representative embodiments, the source and destination devices 112, 114 may operate in a substantially symmetrical manner such that each of the devices 112, 114 may include both video encoding and decoding components and/or elements (collectively "elements"). Hence, the system 100 may support any of one-way and two-way video transmission between the source and destination devices 112, 114 (e.g., for any of video streaming, video playback, video broadcasting, video telephony and/or video conferencing, among others). In certain representative embodiments, the source device 112 may be, for example, a video streaming server adapted to generate (and/or receive the video data and to generate) the encoded video information for one or more destination devices, where the destination devices may be in communication with the source device 112 over wired and/or wireless communication systems.

The external video source and/or the video source 124 may be and/or include a video capture device, such as a video camera, a video archive containing previously captured video, and/or a video feed from a video content provider. In certain representative embodiments, the external video source and/or the video source 124 may generate computer graphics-based data as the source video, or a combination of live video, archived video, and/or computer-generated video. In certain representative embodiments, when the video source 124 is a video camera, the source device 112 and destination device 114 may be or may embody camera phones or video phones.

The captured, pre-captured, computer-generated video, video feed, and/or other type of the video data (collectively "un-encoded video") may be encoded by the video encoder unit 118 to form the encoded video information. The Tx/Rx unit 120 may modulate the encoded video information (e.g., according to a communication standard, to form one or more modulated signals carrying the encoded video information). The Tx/Rx unit 120 may pass the modulated signals to its transmitter for transmission. The transmitter may transmit the modulated signals via the Tx/Rx element 122 to the destination device 114.

At the destination device 114, the Tx/Rx unit 128 may receive the modulated signals from over channel 116 via the Tx/Rx element 126. The Tx/Rx unit 128 may demodulate the modulated signals to obtain the encoded video information. The TxIRX unit 128 may pass the encoded video information to the video decoder unit 130.

The video decoder unit 130 may decode the encoded video information to obtain decoded video data. The encoded video information may include syntax information defined by the video encoder unit 118. This syntax information may include one or more elements ("syntax elements"); some or all of which may be useful for decoding the encoded video information. The syntax elements may include, for example, characteristics of the encoded video information. The syntax elements may also include characteristics, and/or describe the processing, of the un-encoded video used to form the encoded video information.

The video decoder unit 130 may output the decoded video data for later storage and/or display on the external display (not shown). In certain representative embodiments, the video decoder unit 130 may output the decoded video data to the display device 132. The display device 132 may be and/or may include any individual, multiple, combination, of a variety of display devices adapted to display the decoded video data to a user. Examples of such display devices include a liquid crystal display (LCD), a plasma display, an organic light emitting diode (OLED) display, and/or a cathode ray tube (CRT), among others.

The communication channel 116 may be any wireless or wired communication medium, such as a radio frequency (RF) spectrum or one or more physical transmission lines, or any combination of wireless and wired media. The communication channel 116 may form part of a packet-based network, such as a local area network, a wide-area network, or a global network, such as the Internet. The communication channel 116 generally represents any suitable communication medium, or collection of different communication media, for transmitting video data from the source device 112 to the destination device 114, including any suitable combination of wired and/or wireless media. The communication channel 116 may include routers, switches, base stations, and/or any other equipment that may be useful to facilitate communication from the source device 112 to the destination device 114. Details of an example communications system, which may facilitate such communication between the devices 112, 114, are provided below with reference to FIG. 15A-15E. Details of devices that may be representative of the source and destination devices 112, 114 are provided below, as well.

The video encoder unit 118 and the video decoder unit 130 may operate according to one or more standards and/or specifications, such as, for example, MPEG-2, H.261, H.263, H.264, H.264/AVC, and/or H.264 as extended according to SVC extensions ("H.264/SVC"), among others. One of skill understands that the methods, apparatus and/or systems set forth herein are applicable to other video encoders, decoders, and/or CODECs implemented according to (and/or compliant with) different standards, or to proprietary video encoders, decoders and/or CODECs, including future video encoders, decoders and/or CODECs. The techniques set forth herein are not limited to any particular coding standard.

Relevant portions of H.264/AVC noted above are available from the International Telecommunications Union as ITU-T Recommendation H.264, or more specifically, "ITU-T Rec. H.264 and ISO/IEC 14496-10 (MPEG4-AVC), 'Advanced Video Coding for Generic Audiovisual Services,' v5, March, 2010;" which is incorporated herein by reference, and which may be referred to herein as the H.264 standard, H.264 specification, the H.264/AVC standard and/or specification. The techniques provided herein may be applied to devices that conform to (e.g., generally conform to) the H.264 standard.

Although not shown in FIG. 1A, each of the video encoder and video decoder units 118, 130 may include and/or be integrated with an audio encoder and/or an audio decoder (as appropriate). The video encoder and video decoder units 118, 130 may include appropriate MUX-DEMUX units, or other hardware and/or software, to handle encoding of both audio and video in a common data stream and/or separate data streams. If applicable, the MUX-DEMUX units may conform, for example, to the ITU-T Recommendation H.223 multiplexer protocol and/or other protocols such as the user datagram protocol (UDP).

One or more video encoder and/or video decoder units 118, 130 may be included in one or more encoders and/or decoders; any of which may be integrated as part of a CODEC, and may be integrated and/or combined with a respective camera, computer, mobile device, subscriber device, broadcast device, set-top box and/or server, among others. The video encoder unit 118 and/or the video decoder unit 130 may be implemented as any of a variety of suitable encoder and/or decoder circuitries, respectively, such as one or more microprocessors, digital signal processors (DSPs), application specific integrated circuits (ASICs), field programmable gate arrays (FPGAs), discrete logic, software, hardware, firmware or any combinations thereof. Either or both of the video encoder and video decoder units 118, 130 may be implemented substantially in software, and operations of the elements of the video encoder unit 118 and/or the video decoder unit 130 may be performed by appropriate software instructions executed by one or more processors (not shown). Such an embodiment, in addition to the processor, may contain off-chip components, for example, external storage (e.g., in the form of non-volatile memory) and/or input/output interfaces, among others.

In any embodiment in which operations of elements of the of the video encoder and/or video decoder units 118, 130 may be performed by software instructions executed by one or more processors, the software instructions may be maintained on a computer readable medium including, for example, magnetic disks, optical disks, any other volatile (e.g., Random Access Memory ("RAM")) non-volatile (e.g., Read-Only Memory ("ROM")), and/or mass storage system readable by the CPU, among others. The computer readable medium may include cooperating or interconnected computer readable medium, which may exist exclusively on the processing system and/or are distributed among multiple interconnected processing systems that may be local or remote to the processing system.

Figure 1B:
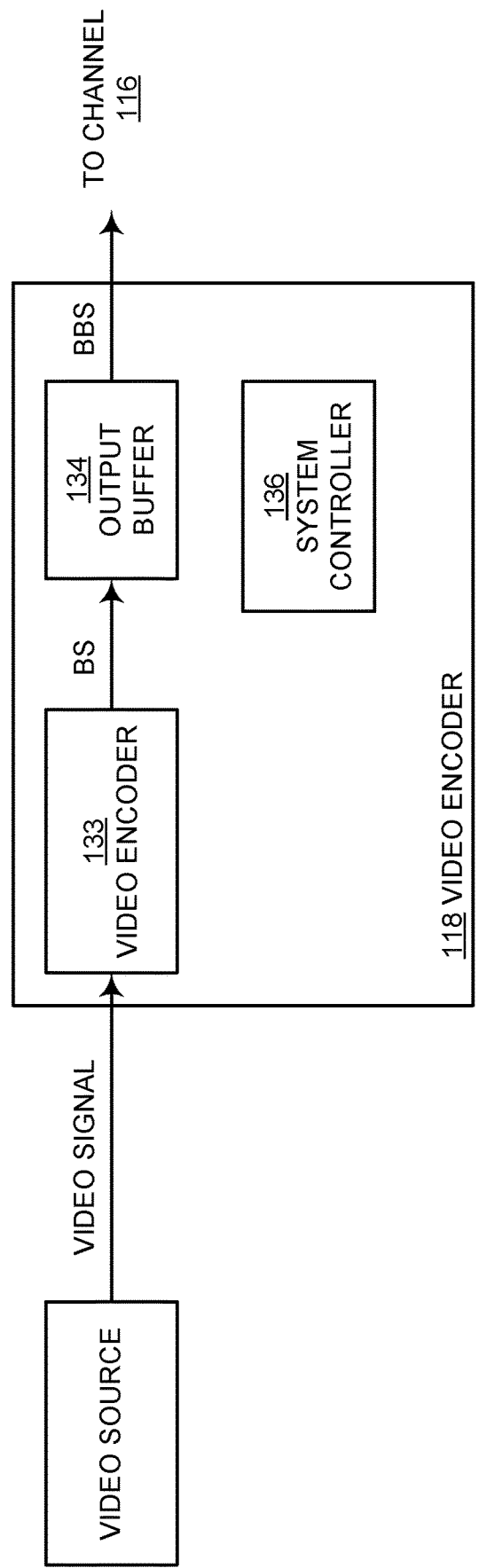
FIG. 1B is a block diagram illustrating an example video encoder unit for use with the video encoding and/or decoding system of FIG. 1A.

FIG. 1B is a block diagram illustrating an example video encoder unit 118 for use with a video encoding and/or decoding system, such as the system 100. The video encoder unit 118 may include a video encoder 133, an output buffer 134, and a system controller 136. The video encoder 133 (or one or more elements thereof) may be implemented according to one or more standards and/or specifications, such as, for example, H.261, H.263, H.264, H.264/AVC, SVC extensions of H.264/AVC (H.264/AVC Annex G), HEVC, and/or scalable extensions of HEVC (SHVC), among others. One of skill understands the methods, apparatus and/or systems provided herein may be applicable to other video encoders implemented according to different standards and/or to proprietary CODECs, including future CODECs.

The video encoder 133 may receive a video signal provided from a video source, such as, the video source 124 and/or the external video source. This video signal may include the un-encoded video. The video encoder 133 may encode the un-encoded video, and provide an encoded (i.e., compressed) video bitstream (BS) at its output.

The encoded video bitstream BS may be provided to an output buffer 134. The output buffer 134 may buffer the encoded video bitstream BS, and may provide such encoded video bitstream BS, as a buffered bitstream (BBS), for transmission via the communication channel 116.

The buffered bitstream BBS output from the output buffer 134 may be sent to a storage device (not shown) for later viewing or transmission. In certain representative embodiments, the video encoder unit 118 may be configured for visual communication in which the buffered bitstream BBS may be transmitted via the communication channel 116 at a specified constant and/or variable bit rate (e.g., with a delay (for example, a very low or minimal delay)).

The encoded video bitstream BS, and in turn, the buffered bitstream BBS may carry bits of the encoded video information. The bits of the buffered bitstream BBS may be arranged as a stream of encoded video frames. The encoded video frames may be intra-coded frames (e.g., I-frames), or inter-coded frames (e.g., B-frames and/or P-frames). The stream of encoded video frames may be arranged, for example, as a series of Groups of Pictures (GOPs), with the encoded video frames of each GOP arranged in a specified order. Generally, each GOP may start with an intra-coded frame (e.g., an I-frame) followed by one or more inter-coded frames (e.g., P-frames and/or B-frames). Each GOP may include only a single intra-coded frame; although any of the GOPs may include multiples. It is contemplated that B-frames might not be used for real-time, low delay applications as, for example, bi-directional prediction may cause extra coding delay compared to uni-directional prediction (P-frames). Additional and/or other frame types may be used, and the particular ordering of the encoded video frames may be modified as understood by one skilled in the art.

Each GOP may include syntax data ("GOP syntax data"). The GOP syntax data may be disposed in a header of the GOP, in a header of one or more frames of the GOP, and/or elsewhere. The GOP syntax data may indicate ordering, quantity, or type, and/or describe the encoded video frames of the respective GOP. Each encoded video frame may include syntax data ("encoded-frame syntax data"). The encoded-frame syntax data may indicate and/or describe an encoding mode for the respective encoded video frame.

The system controller 136 may monitor various parameters and/or constraints associated with the channel 116, computational capabilities of the video encoder unit 118, demands by the users, etc., and may establish target parameters to provide an attendant quality of experience (QoE) suitable for the specified constraints and/or conditions of the channel 116. One or more of the target parameters may be adjusted from time to time or periodically depending upon the specified constraints and/or channel conditions. As an example, the QoE may be assessed quantitatively using one or more metrics for assessing video quality, including, for example, a metric commonly referred to as relative perceptive quality of encoded video sequences. The relative perceptive quality of encoded video sequences, measured, for example, using a peak-signal-to-noise ratio ("PSNR") metric, may be controlled by a bit rate (BR) of the encoded bitstream BS. One or more of the target parameters (including, for example, a quantization parameter (QP)) may be adjusted to maximize the relative perceptive quality of video within the constraints associated with the bite rate of the encoded bitstream BS.

Figure 2:
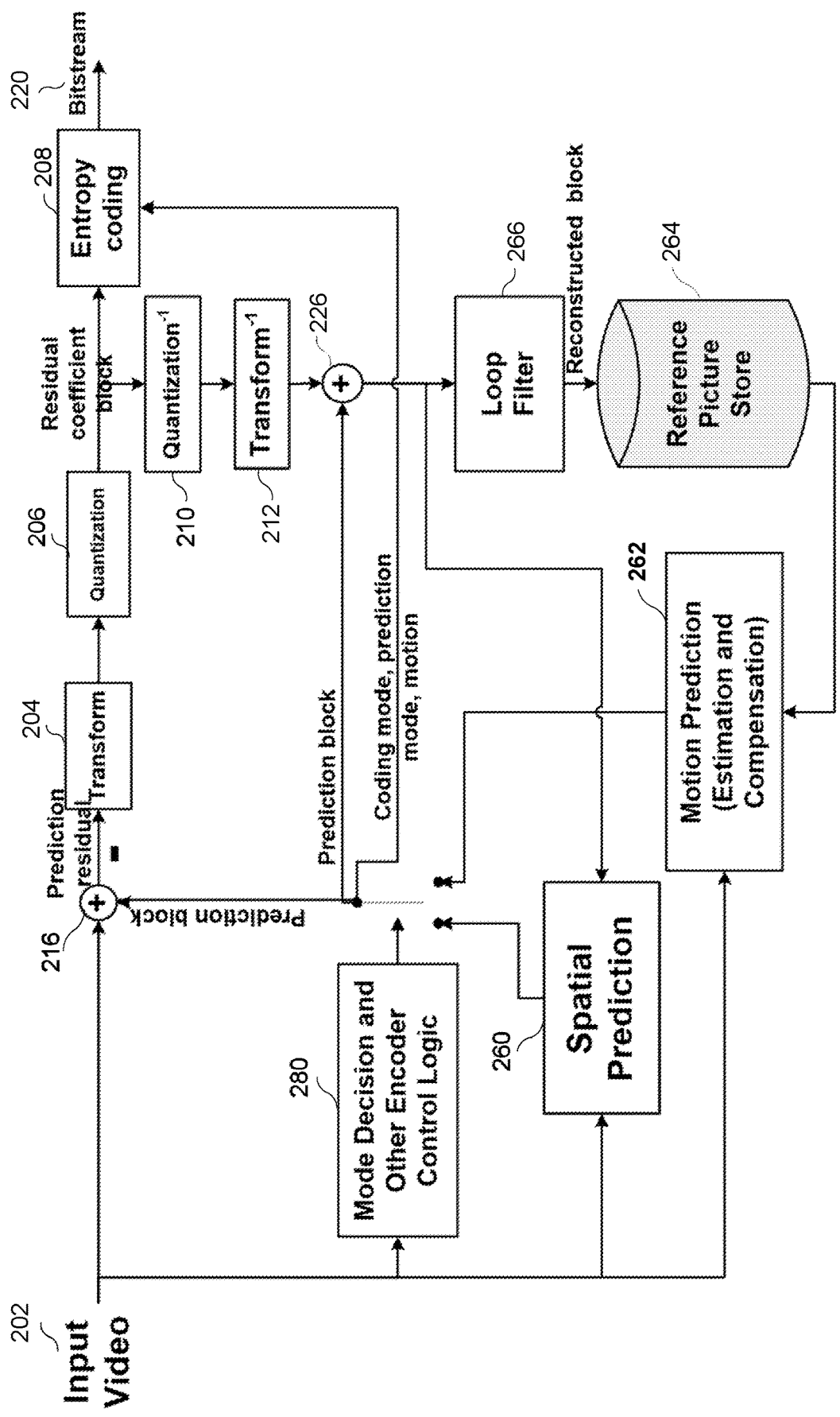
FIG. 2 is a block diagram of a generic block-based hybrid video encoding system.

FIG. 2 is a block diagram of a block-based hybrid video encoder 200 for use with a video encoding and/or decoding system, such as system 100.

Referring to FIG. 2, the block-based hybrid encoding system 200 may include a transform unit 204, a quantization unit 206, an entropy coding unit 208, an inverse quantization unit 210, an inverse transform unit 212, an first adder 216, a second adder 226, a spatial prediction unit 260, a motion prediction unit 262, a reference picture store 264, one or more filters 266 (e.g., loop filters), and/or a mode decision and encoder controller unit 280, among others.

Details of the video encoder 200 are meant merely to be illustrative, and real world implementations may differ. A real world implementation, for example, may include more, fewer, and/or different elements, and/or may be arranged differently from the arrangement shown in FIG. 2. For example, although shown separately, some or all functionality of both of the transform unit 204 and quantization unit 206 may be highly integrated in some of the real-world implementations, such as, for example, implementations that use the core transform of the H.264 standard. Similarly, the inverse quantization unit 210 and inverse transform unit 212 may be highly integrated in some of the real-world implementations (e.g., H.264 or HEVC-standard-compliant implementations), but are likewise illustrated separately for conceptual purposes.

As described above, the video encoder 200 may receive the video signal at its input 202. The video encoder 200 may generate the encoded video information from the received un-encoded video, and output the encoded video information (e.g., any of intra-frames or inter-frames) from its output 220 in the form of the encoded video bitstream BS. The video encoder 200 may operate, for example, as a hybrid video encoder, and employ a block-based coding process for encoding the un-encoded video. When performing such an encoding process, the video encoder 200 may operate on individual frames, pictures, and/or images (collectively "un-encoded pictures") of the un-encoded video.

To facilitate the block-based encoding process, the video encoder 200 may slice, partition, divide, and/or segment (collectively "segment") each un-encoded picture received at its input 202 into multiple un-encoded video blocks. For example, the video encoder 200 may segment the un-encoded picture into multiple un-encoded video segments (e.g., slices) and may (e.g., then may) segment each of the un-encoded video segments into the un-encoded video blocks. The video encoder 200 may pass, supply, send, or provide the un-encoded video blocks to the spatial prediction unit 260, the motion prediction unit 262, the mode decision and encoder controller unit 280 and/or the first adder 216. As described in more detail below, the un-encoded video blocks may be provided on a block-by-block basis.

The spatial prediction unit 260 may receive the un-encoded video blocks, and encode such video blocks in intra-mode. Intra-mode refers to any of several modes of spatial-based compression, and encoding in intra-mode endeavors to provide spatial-based compression of the un-encoded picture. The spatial-based compression, if any, may result from reducing or removing spatial redundancy of video information within the un-encoded picture. In forming the prediction blocks, the spatial prediction unit 260 may perform spatial prediction (or "intra-prediction") of each un-encoded video block relative to one or more video blocks of the un-encoded picture that have been already encoded ("encoded video blocks") and/or reconstructed ("reconstructed video blocks"). The encoded and/or reconstructed video blocks may be neighbors of, adjacent to, or in proximity (e.g., close proximity) to, the un-encoded video block.

The motion prediction unit 262 may receive the un-encoded video blocks from the input 202, and encode them in inter-mode. Inter-mode refers to any of several modes of temporal-based compression, including, for example, P-mode (uni-directional prediction) and/or B-mode (bi-directional prediction). Encoding in inter-mode endeavors to provide temporal-based compression of the un-encoded picture. The temporal-based compression, if any, may result from reducing or removing temporal redundancy of the video information among the un-encoded picture and one or more reference (e.g., adjacent) pictures. The motion/temporal prediction unit 262 may perform temporal prediction (or "inter-prediction") of each un-encoded video block relative to one or more video blocks of the reference pictures ("reference video blocks"). The temporal prediction carried out may be uni-directional prediction (e.g., for P-mode) and/or bi-directional prediction (e.g., for B-mode).

For uni-prediction, the reference video blocks may be from one or more previously encoded and/or reconstructed pictures. The encoded and/or reconstructed picture or pictures may be neighbors of, adjacent to, and/or in proximity to, the un-encoded picture.

For bi-prediction, the reference video blocks may be from one or more previously encoded and/or reconstructed pictures. The encoded and/or reconstructed pictures may be neighbors of, adjacent to, and/or in proximity to, the un-encoded picture.

If multiple reference pictures are used (as may be the case for recent video coding standards such as H.264/AVC and/or HEVC), for each video block, its reference picture index may be sent to the entropy coding unit 208 for subsequent output and/or transmission. The reference index may be used to identify from which reference picture or pictures in the reference picture store 264 the temporal prediction comes.

Although typically highly integrated, functions of the motion/temporal prediction unit 262 for the motion estimation and motion compensation may be carried out by separate entities or units (not shown). Motion estimation may be carried out to estimate motion for each un-encoded video block relative to the reference-picture video blocks, and may involve generating a motion vector for the un-encoded video block. The motion vector may indicate a displacement of a prediction block relative to the un-encoded video block being coded. This prediction block is the reference-picture video block that is found to closely match, in terms of, for example, pixel difference of the un-encoded video block being coded. The matching may be determined by a sum of absolute difference (SAD), a sum of square difference (SSD), and/or other difference metrics. Motion compensation may involve fetching and/or generating the prediction block based on the motion vector determined by the motion estimation.

The motion prediction unit 262 may calculate the motion vector for the un-encoded video block by comparing the un-encoded video block to the reference video blocks from reference pictures stored in the reference picture store 264. The motion prediction unit 262 may calculate values for fractional pixel positions of a reference picture included in reference picture store 264. In some instances, the adder 226 or another unit of the video encoder 200 may calculate the fractional pixel position values for reconstructed video blocks, and may store the reconstructed video blocks, with the calculated values for the fractional pixel positions, in reference picture store 264. The motion prediction unit 262 may interpolate sub-integer pixels of the reference picture (e.g., of an I-frame and/or a P-frame and/or a B-frame).

The motion prediction unit 262 may be configured to encode the motion vector relative to a selected motion predictor. The motion predictor selected by the motion/temporal prediction unit 262 may be, for example, a vector equivalent to a mean of motion vectors of neighboring blocks that have already been encoded. To encode the motion vector for the un-encoded video block, the motion/temporal prediction unit 262 may calculate the difference between the motion vector and the motion predictor to form a motion vector difference value.

H.264 and HEVC refer to a set of potential reference frames as a "list." A set of reference pictures stored in reference picture store 264 may correspond to such a list of reference frames. The motion/temporal prediction unit 262 may compare the reference video blocks of the reference pictures from reference picture store 264 to the un-encoded video block (e.g., of a P-frame or a B-frame). When the reference pictures in reference picture store 264 include values for sub-integer pixels, the motion vector calculated by motion/temporal prediction unit 262 may refer to a sub-integer pixel location of the reference picture. The motion/temporal prediction unit 262 may send the calculated motion vector to the entropy coding unit 208 and to the motion compensation functions of the motion/temporal prediction unit 262. The motion prediction unit 262 (or the motion compensation functions thereof) may calculate error values for the prediction block relative to the un-encoded video block being coded. The motion prediction unit 262 may calculate prediction data based on the prediction block.

The mode decision and encoder controller unit 280 may select one of the coding modes, intra-mode, or inter-mode. The mode decision and encoder controller unit 280 may do so based on a rate-distortion optimization method and/or on error results produced in each mode, for example.

The video encoder 200 may form a block of residuals ("residual video block") by subtracting the prediction data provided from motion prediction unit 262 from the un-encoded video block being coded. The adder 216 represents an element or multiple elements that may perform this subtraction operation.

The transform unit 204 may apply a transform to the residual video block to convert such residual video block from a pixel value domain to a transform domain, such as a frequency domain. The transform may be, for example, any of the transforms provided herein, a discrete cosine transform (DCT), or a conceptually similar transform. Other examples of the transform include those defined in H.264 and/or HEVC, wavelet transforms, integer transforms, and/or sub-band transforms, among others. Application of the transform to the residual video block by the transform unit 204 produces a corresponding block of transform coefficients of the residual video block ("residual-transform coefficients"). These residual-transform coefficients may represent magnitudes of frequency components of the residual video block. The transform unit 204 may forward the residual-transform coefficients to the quantization unit 206.

The quantization unit 206 may quantize the residual-transform coefficients to reduce further the encoded bit rate. The quantization process, for example, may reduce the bit depth associated with some or all of the residual-transform coefficients. In certain instances, the quantization unit 206 may divide the values of residual-transform coefficients by a quantization level corresponding to the QP to form a block of quantized transform coefficients. The degree of quantization may be modified by adjusting the QP value. The quantization unit 206 may apply the quantization to represent the residual-transform coefficients using a desired number of quantization steps; the number of steps used (or correspondingly the value of the quantization level) may determine the number of encoded video bits used to represent the residual video block. The quantization unit 206 may obtain the QP value from a rate controller (not shown). Following quantization, the quantization unit 206 may provide the quantized transform coefficients to the entropy coding unit 208 and to the inverse quantization unit 210.

The entropy coding unit 208 may apply entropy coding to the quantized transform coefficients to form entropy-coded coefficients (i.e., a bitstream). The entropy coding unit 208 may use adaptive variable length coding (CAVLC), context adaptive binary arithmetic coding (CABAC) and/or another entropy coding technique to form the entropy-coded coefficients. CABAC, as understood by those skilled in the art, may require input of contextual information ("context"). This context may be based on neighboring video blocks, for instance.

The entropy coding unit 208 may provide the entropy-coded coefficients along with the motion vectors and one or more reference picture indices in the form of a raw encoded video bitstream to an internal bitstream format (not shown). This bitstream format may form the encoded video bitstream BS provided to the output buffer 134 (FIG. 1B) by appending to the raw encoded video bitstream additional information, including headers and/or other information to enable, for example, the video decoder unit 300 (FIG. 3) to decode the encoded video block from the raw encoded video bitstream. Following the entropy coding, the encoded video bitstream BS provided from the entropy coding unit 208 may be output, for example, to the output buffer 134, and may be transmitted, for example, to the destination device 114 via the channel 116 or archived for later transmission or retrieval.

In certain representative embodiments, the entropy coding unit 208 or another unit of video encoder 133, 200 may be configured to perform other coding functions, in addition to entropy coding. For example, the entropy coding unit 208 may be configured to determine the Code Block Pattern (CBP) values for the video blocks. In certain representative embodiments, the entropy coding unit 208 may perform run length coding of the quantized transform coefficients in a video block. As an example, the entropy coding unit 208 may apply a zigzag scan or other scan pattern to arrange the quantized transform coefficients in a video block and encode runs of zeroes for further compression. The entropy coding unit 208 may construct the header information with appropriate syntax elements for transmission in the encoded video bitstream BS.

The inverse quantization unit 210 and inverse transform unit 212 may apply inverse quantization and inverse transformation, respectively, to reconstruct a residual video block in the pixel domain, e.g., for later use as one of the reference video blocks (e.g., within one of the reference pictures in the reference picture list).

The mode decision and encoder controller unit 280 may calculate the reference video block by adding the reconstructed residual video block to the prediction block of one of the reference pictures stored in the reference picture store 264. The mode decision and encoder controller unit 280 may apply one or more interpolation filters to the reconstructed residual video block to calculate sub-integer pixel values (e.g., for half-pixel positions) for use in motion estimation.

The adder 226 may add the reconstructed residual video block to the motion compensated prediction video block to produce a reconstructed video block for storage in the reference picture store 264. The reconstructed (pixel value domain) video block may be used by the motion prediction unit 262 (or motion estimation functions thereof and/or the motion compensation functions thereof) as one of the reference blocks for inter-coding an un-encoded video block in subsequent un-encoded video.

The filters 266 (e.g., loop filters) may include a deblocking filter. The deblocking filter may operate to remove visual artifacts that may be present in reconstructed macro-blocks.

These artifacts may be introduced in the encoding process due to, for example, the use of different modes of encoding such as I-type, P-type or B-type. Artifacts may be present, for example, at boundaries and/or edges of the received video blocks, and the de-blocking filter may operate to smooth the boundaries and/or edges of the video blocks to improve visual quality. The deblocking filter may filter the output of the adder 226. The filters 266 may include other in-loop filters, such as the Sample Adaptive Offset (SAO) filter supported by the HEVC standard.

Figure 3:
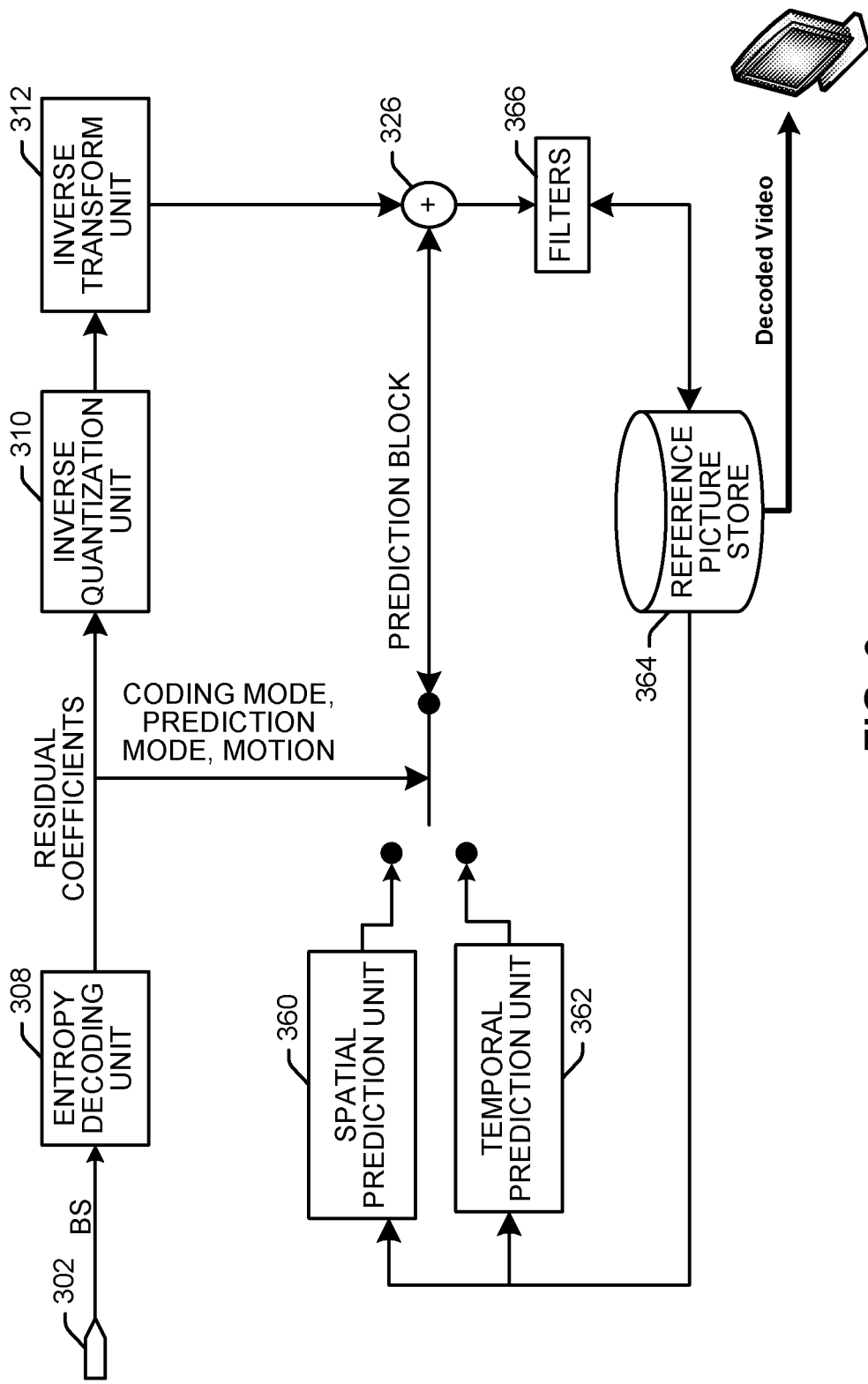
FIG. 3 is a general block diagram of a block-based video decoder.

FIG. 3 is a block diagram illustrating an example of a video decoder 300 for use with a video decoder unit, such as the video decoder unit 130 of FIG. 1A. The video decoder 300 may include an input 302, entropy decoding unit 308, a motion compensated prediction unit 362, a spatial prediction unit 360, an inverse quantization unit 310, an inverse transform unit 312, a reference picture store 364, filters 366, an adder 326, and an output 320. The video decoder 300 may perform a decoding process that is, generally, reciprocal to the encoding process provided with respect to the video encoder 133, 200. This decoding process may be carried out as set forth below.

The motion compensated prediction unit 362 may generate prediction data based on motion vectors received from the entropy decoding unit 308. The motion vectors may be encoded relative to a motion predictor for a video block corresponding to the encoded motion vector. The motion compensated prediction unit 362 may determine the motion predictor, for example, as the median of motion vectors of blocks neighboring the video block to be decoded. After determining the motion predictor, the motion compensated prediction unit 362 may decode the encoded motion vector by extracting a motion vector difference value from the encoded video bitstream BS and adding the motion vector difference value to the motion predictor. The motion compensated prediction unit 362 may quantize the motion predictor to the same resolution as the encoded motion vector. In certain representative embodiments, the motion compensated prediction unit 362 may use the same precision for some or all encoded motion predictors. As another example, the motion compensated prediction unit 362 may be configured to use either of the above methods, and to determine which method to use by analyzing data included in a sequence parameter set, slice parameter set, or picture parameter set obtained from the encoded video bitstream BS.

After decoding the motion vector, the motion compensated prediction unit 362 may extract a prediction video block identified by the motion vector from a reference picture of reference picture store 364. If the motion vector points to a fractional pixel position, such as a half-pixel, the motion compensated prediction unit 362 may interpolate values for the fractional pixel positions. The motion compensated prediction unit 362 may use adaptive interpolation filters or fixed interpolation filters to interpolate these values. The motion compensated prediction unit 362 may obtain indicia of which of the filters 366 to use, and in various representative embodiments, coefficients for the filters 366, from the received encoded video bitstream BS.

The spatial prediction unit 360 may use intra prediction modes received in the encoded video bitstream BS to form a prediction video block from spatially adjacent blocks. Inverse quantization unit 310 may inverse quantize, (e.g., de-quantize, quantized block coefficients provided in the encoded video bitstream BS and decoded by the entropy decoding unit 308). The inverse quantization process may include a conventional process, e.g., as defined by H.264. The inverse quantization process may include use of a quantization parameter QP calculated by the video encoder 133, 200 for each video block to determine a degree of quantization and/or a degree of inverse quantization to be applied.

The inverse transform unit 312 may apply an inverse transform (e.g., an inverse of any of the transforms provided herein, inverse DCT, an inverse integer transform, or a conceptually similar inverse transform process) to the transform coefficients to produce residual video blocks in the pixel domain. The motion compensated prediction unit 362 may produce motion compensated blocks, and may perform interpolation based on interpolation filters. Identifiers for interpolation filters to be used for motion estimation with sub-pixel precision may be included in syntax elements of the video block. The motion compensated prediction unit 362 may use the interpolation filters as used by the video encoder 133, 200 during encoding of the video block to calculate interpolated values for sub-integer pixels of a reference block. The motion compensated prediction unit 362 may determine the interpolation filters used by the video encoder 133, 200 according to received syntax information and use the interpolation filters to produce prediction blocks.

The motion compensated prediction unit 262 may use: (1) the syntax information to determine sizes of the video blocks used to encode one or more pictures of the encoded video sequence; (2) partition information that describes how each video block of a frame of the encoded video sequence is partitioned; (3) modes (or mode information) indicating how each partition is encoded; (4) one or more reference pictures for each inter-encoded video block, and/or (5) other information to decode the encoded video sequence.

The adder 326 may sum the residual blocks with the corresponding prediction blocks generated by the motion compensated prediction unit 362 or the spatial prediction unit 360 to form decoded video blocks. Loop filters 366 (e.g., deblocking filters or SAO filters) may be applied to filter the decoded video blocks to remove blockiness artifacts and/or to improve visual quality. The decoded video blocks may be stored in reference picture store 364, which may provide the reference video blocks for subsequent motion compensation and may produce decoded video for presentation on a display device (not shown).

Point Cloud Compression

Figure 4:
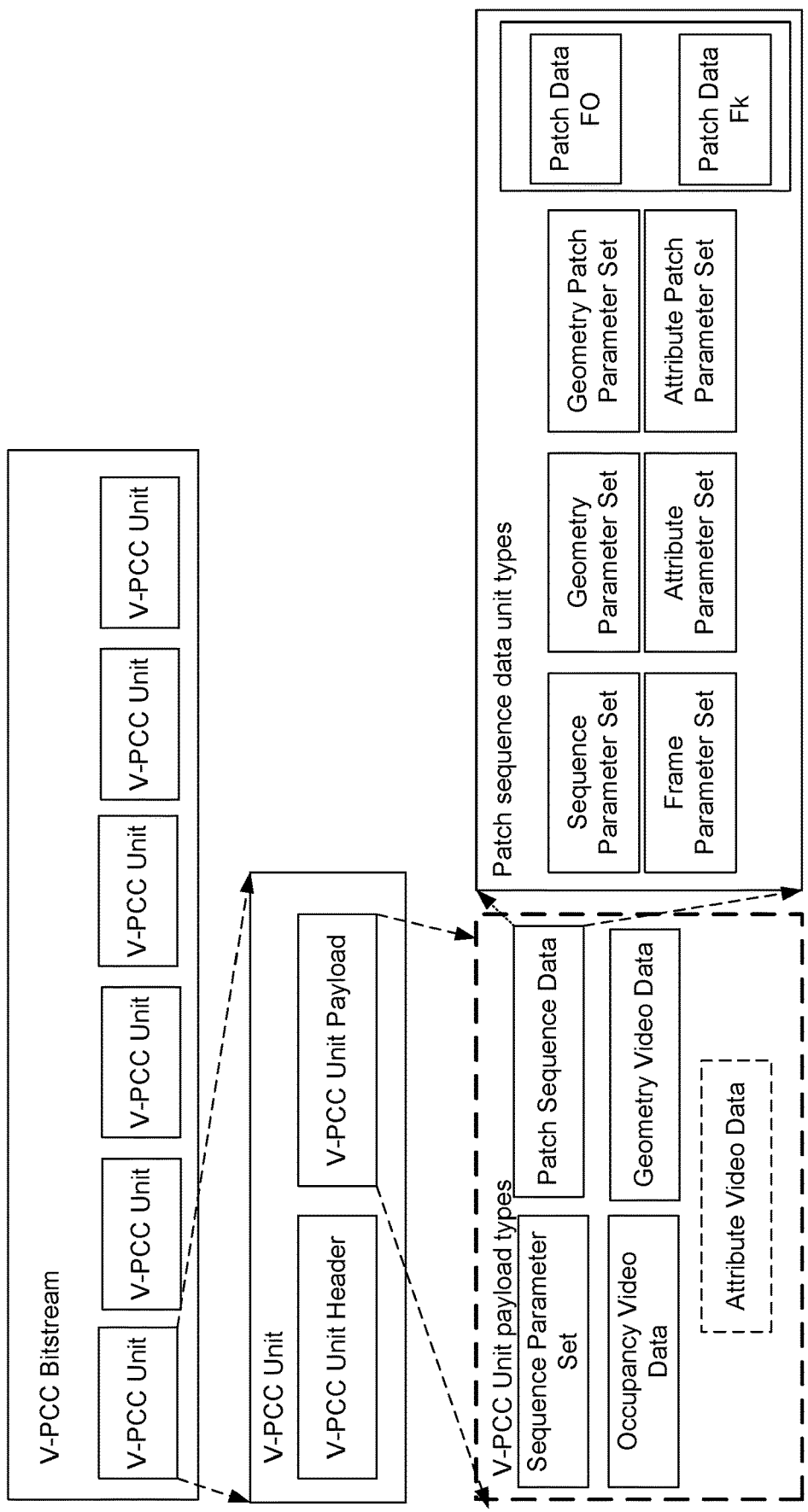
FIG. 4 illustrates the structure of a bitstream for the video-based point cloud compression (V-PCC)

FIG. 4 demonstrates the structure of the bitstream for video-based point cloud compression (V-PCC). The generated video bitstreams and the metadata are multiplexed together to generate the final V-PCC bitstream.

The V-PCC bitstream is composed of a set of V-PCC units as shown in FIG. 4. The syntax of a V-PCC unit as defined in the latest version of the V-PCC standard's community draft (V-PCC CD) is given in Table 1, where each V-PCC unit has a V-PCC unit header and a V-PCC unit payload. The V-PCC unit header describes the V-PCC unit type (Table 2). V-PCC units with unit types 2, 3, and 4, are occupancy, geometry, and attribute data units, as defined in the community draft. These data units represent the three main components needed for reconstructing the point cloud. In addition to the V-PCC unit type, a V-PCC attribute unit header also specifies the attribute type and its index, allowing multiple instance of the same attribute type to be supported.

The payload of occupancy, geometry, and attribute V-PCC units (Table 3) correspond to video data units (e.g., HEVC NAL (network Abstraction Layer) units) that could be decoded by the video decoder specified in the corresponding occupancy, geometry, and attribute parameter set V-PCC unit.

TABLE 1

V-PCC unit syntax

| | Descriptor |
|---|---|
| vpcc_unit( ) { | |
|   vpcc_unit_header( ) | |
|   vpcc_unit_payload( ) | |
| } | |

TABLE 2

V-PCC unit header syntax

| | Descriptor |
|---|---|
| vpcc_unit_header( ) { | |
|   vpcc_unit_type | u(5) |
|   if( vpcc_unit_type = = VPCC_AVD \|\| vpcc_unit_type = = VPCC_GVD \|\| | |
|     vpcc_unit_type = = VPCC_OVD \|\| vpcc_unit_type = = VPCC_PSD ) | |
|     vpcc_sequence_parameter_set_id | u(4) |
|   if( vpcc_unit_type = = VPCC_AVD ) { | |
|     vpcc_attribute_index | u(7) |
|     if( sps_multiple_layer_streams_present_flag ) { | |
|       vpcc_layer_index | u(4) |
|       pcm_separate_video_data( 11 ) | |
|     } | |
|     else | |
|       pcm_separate_video_data( 15 ) | |
|   } else if( vpcc_unit_type = = VPCC_GVD ) { | |
|     if( sps_multiple_layer_streams_present_flag ) { | |
|       vpcc_layer_index | u(4) |
|       pcm_separate_video_data( 18 ) | |
|     } | |
|     else | |
|       pcm_separate_video_data( 22 ) | |
|   } else if( vpcc_unit_type = = VPCC_OVD \|\| vpcc_unit_type = = VPCC_PSD ) { | |
|     vpcc_reserved_zero_23bits | u(23) |
|   } else | |
|     vpcc_reserved_zero_27bits | u(27) |
| } | |

TABLE 3

V-PCC unit payload syntax

| | Descriptor |
|---|---|
| vpcc_unit_payload( ) { | |
|   if( vpcc_unit_type = = VPCC_SPS ) | |
|     sequence_paranneter_set( ) | |
|   else if( vpcc_unit_type = = VPCC_PSD ) | |
|     patch_sequence_data_unit( ) | |
|   else if( vpcc_unit_type = = VPCC_OVD \|\| | |
|     vpcc_unit_type = = VPCC_GVD \|\| | |
|     vpcc_unit_type = = VPCC_AVD) | |
|     video_data_unit( ) | |
| } | |

Dynamic Streaming Over HTTP (DASH)

MPEG Dynamic Adaptive Streaming over HTTP (MPEG-DASH) is a universal delivery format that provides end users with the best possible video experience by dynamically adapting to changing network conditions.

HTTP adaptive streaming, such as MPEG-DASH, requires various bitrate alternatives of the multimedia content to be available at the server. In addition, the multimedia content may comprise several media components (e.g. audio, video, text), each of which may have different characteristics. In MPEG-DASH, these characteristics are described by Media Presentation Description (MPD).

Figure 5:
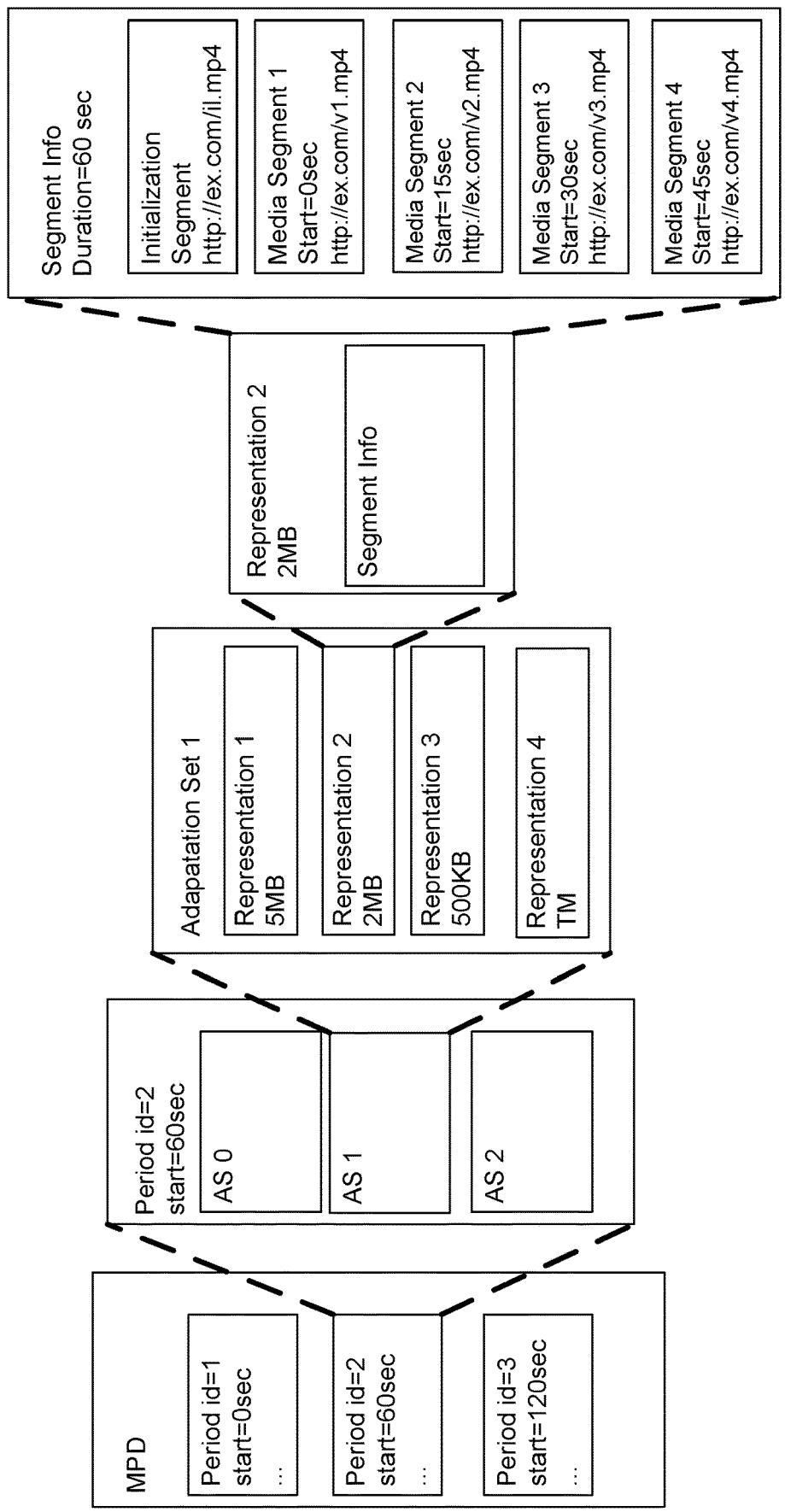
FIG. 5 illustrates the MPD hierarchical data model.

FIG. 5 demonstrates the MPD hierarchical data model. The MPD describes the sequence of Periods, where a consistent set of encoded versions of the media content components does not change during a Period. Each Period has a starting time and duration and is composed of one or multiple adaptation sets (AdaptationSet).

An Adaptation Set represents a set of encoded versions of one or several media content components sharing the identical properties such as the language, the media type, the picture aspect ratio, the role, the accessibility, and the rating property. For instance, an AdaptationSet may contain different bitrates of the video component of the same multimedia content. Another AdaptationSet may contain different bitrates of the audio component (e.g. lower quality stereo and higher quality surround sound) of the same multimedia content. Each AdaptationSet usually includes multiple Representations.

A Representation describes a deliverable encoded version of one or several media components, varying from other representations by bitrate, resolution, number of channels or other characteristics. Each Representation consists of one or multiple segments. The attributes of Representation element such as @id, @bandwidth, @qualityRanking, and @dependencyId are used to specify the properties of the associated Representation. Representations may also include Sub-Representations, which is part of the Representation, to describe and extract partial information from a Representation. Sub-Representations may provide the ability to access a lower quality version of the Representation in which they are contained.

A Segment is the largest unit of data that can be retrieved with a single HTTP request. Each segment has a URL, i.e. an addressable location on a server, which can be downloaded using HTTP GET or HTTP GET with byte ranges.

To use this data model, the DASH client parses the MPD XML document, selects a collection of AdaptationSets suitable for its environment based on information provided in each of the AdaptationSet elements. Within each AdaptationSet, the client selects one Representation, typically based on the value of the @bandwidth attribute, but also taking into account client decoding and rendering capabilities. The client downloads the initialization segment of the selected Representations and then accesses the content by requesting entire Segments or byte ranges of Segments. Once the presentation has started, the client continues consuming the media content by continuously requesting Media Segments or parts of Media Segments and playing content according to the media presentation timeline. The client may switch Representations taking into account updated information from its environment. The client should play the content continuously across Periods. Once the client is consuming media contained in the Segments towards the end of the announced media in the Representation, then either the Media Presentation is terminated, a new Period is started or the MPD needs to be re-fetched.

Descriptors in DASH

MPEG-DASH introduces the concept of descriptors to provide application-specific information about the media content. Descriptor elements are all structured in the same way, namely, they contain a @schemeIdUri attribute that provides a URI to identify the scheme, an optional attribute @value, and an optional attribute @id. The semantics of the element are specific to the scheme employed. The URI identifying the scheme may be a URN (Universal Resource Name) or a URL (Universal Resource Locator). The MPD does not provide any specific information on how to use these elements. It is up to the application that employs DASH formats to instantiate the descriptor elements with appropriate scheme information. DASH applications that use one of these elements must first define a Scheme Identifier in the form of a URI and must then define the value space for the element when that Scheme Identifier is used. If structured data is required, then any extension element or attribute may be defined in a separate namespace. Descriptors may appear at a number of levels within the MPD:

The presence of an element at the MPD level means that the element is a child of the MPD element.

The presence of an element at the adaptation set level means that the element is a child element of an AdaptationSet element.

The presence of an element at the representation level means that the element is a child element of a Representation element.

Preselections

In MPEG-DASH, a bundle is a set of media components which may be consumed jointly by a single decoder instance. Each bundle includes a main media component that contains the decoder specific information and bootstraps the decoder. A PreSelection defines a subset of media components in a bundle that are expected to be consumed jointly.

The AdaptationSet that contains the main media component is referred to as the main AdaptationSet. The main media component is always included in any PreSelection that is associated with a bundle. In addition, each bundle may include one or multiple partial AdaptationSets. Partial AdaptationSets may only be processed in combination with the main AdaptationSet.

Preselection may be defined through the PreSelection element as defined in Table 4. The selection of PreSelections is based on the contained attributes and elements in the PreSelection element.

TABLE 4

Semantics of PreSelection element

| Element or Attribute Name | Use | Description |
| --- | --- | --- |
| Preselection | | |
| @id | OD default = 1 | Specifies the id of the Preselection. This shall be unique within one Period. |
| @preselectionComponents | M | Specifies the ids of the contained Adaptation Sets or Content Components that belong to this Preselection as white space separated list in processing order, where the first id is that of the main media component. |
| @lang | O | Declares the language code for the PreSelection according to the syntax and semantics in IETF RFC 5646. |
| Accessibility | 0 . . . N | Specifies information about accessibility scheme. |
| Role | 0 . . . N | Specifies information on role annotation scheme. |
| Rating | 0 . . . N | Specifies information on rating scheme. |
| Viewpoint | 0 . . . N | Specifies information on viewpoint annotation scheme. |
| CommonAttributesElements | — | Specifies the common attributes and elements (attributes and elements from base type RepresentationBaseType). |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

Adaptive Streaming of Point Clouds

While traditional multimedia applications such as video are still popular, there is a substantial interest in new media, such as VR and immersive 3D graphics. High-quality 3D point clouds have recently emerged as an advanced representation of immersive media, enabling new forms of interaction and communication with virtual worlds. The large volume of information required to represent such dynamic point clouds requires efficient coding algorithms. The 3DG workgroup of MPEG is currently working on developing a standard for video-based point cloud compression with a community draft (CD) version released at the MPEG #124 meeting. The latest version of the CD defines a bitstream for compressed dynamic point clouds. In parallel, MPEG is also developing a systems' standard for carriage of point cloud data.

The aforementioned point cloud standards only address the coding and storage aspects of point clouds. However, it is envisioned that practical point cloud applications will require streaming point cloud data over the network. Such applications may perform either live or on-demand streaming of point cloud content depending on how the content was generated. Moreover, due to the large amount of information required for representing point clouds, such applications need to support adaptive streaming techniques to avoid overloading the network and provide the optimal viewing experience at any given moment with respect to the network capacity at that moment.

One strong candidate method for adaptive delivery of point clouds is dynamic adaptive streaming over HTTP (DASH). However, the current MPEG-DASH standard does not provide any signaling mechanism for point cloud media, including point cloud streams based on the MPEG V-PCC standard. Therefore, it is important to define new signaling elements that enable streaming clients to identify point cloud streams and their component sub-streams within the media presentation descriptor (MPD) file. In addition, it is also necessary to signal different kinds of metadata associated with the point cloud components to enable the streaming client to select the best version(s) of the point cloud or its components that it is able to support.

Unlike traditional media content, V-PCC media content is composed of a number of components, with some components having multiple layers. Each component (and/or layer) is separately encoded as a sub-stream of the V-PCC bitstream. Some component sub-streams, such as geometry and occupancy map (in addition to some attributes, such as texture), are encoded using conventional video encoders (e.g., H.264/AVC or HEVC). However, these sub-streams need to be collectively decoded along with additional metadata in order to render a point cloud.

A number of XML elements and attributes are defined. These XML elements are defined in a separate namespace "urn:mpeg:mpegI:vpcc:2019". The namespace designator "vpcc:" is used to refer to this name space in this document.

Signaling V-PCC Components in DASH MPD

Each V-PCC component and/or component layer can be represented in the DASH manifest (MPD) file as a separate AdaptationSet (hereinafter "component AdaptationSet") with an additional AdaptationSet serving as the main access point for the V-PCC content (hereinafter "main AdaptationSet"). In another embodiment, one adaptation set is signaled per component per resolution.

In an embodiment, adaptation sets for a V-PCC stream, including all V-PCC component AdaptationSets shall have the value of the @codecs attribute (e.g., as defined for V-PCC) set to 'vpct1', which will signify that the MPD pertains to a cloud point. In another embodiment, only the main AdaptationSet has the @codecs attribute set to 'vpc1' while the @codecs attribute for the point cloud components AdaptationSets (or respective Representations if @codecs is not signaled for the AdaptationSet element), is set based on the respective codec used for encoding the component. In the case of video-coded components, the value of @codecs shall be set to 'resv.pccv.XXXX', where XXXX corresponds to the four-character code (4CC) of the video codec (e.g., avc1 or hvc1).

To identify the type of the V-PCC component(s) (e.g., occupancy map, geometry, or attribute) in a component AdaptationSet, an EssentialProperty descriptor may be used with the @schemeIdUri attribute equal to "urn:mpeg:mpegI:vpcc:2019:component". This descriptor is referred to as a VPCCComponent descriptor.

At adaptation set level, one VPCCComponent descriptor may be signaled for each point cloud component that is present in the Representations of the adaptation set.

In an embodiment, the @value attribute of the VPCCComponent descriptor shall not be present. The VPCCComponent descriptor may include elements and attributes as specified in Table 5.

TABLE 5

Elements and attributes for the VPCCComponent descriptor

| Elements and Attributes for VPCCComponent descriptor | Use | Data type | Description |
|---|---|---|---|
| component | 0 ... N | vpcc:vpccComponentType | An element whose attributes specify information for one of the point cloud components present in the representation(s) of the adaptation set. |
| component@component_type | M | xs:string | Indicates the type of the point cloud component. Value 'geom' indicates a geometry component, 'occp' indicates an occupancy component, and 'attr' indicates an attribute component. |
| component@min_layer_index | O | xs:integer | Indicates the index of the first layer of the component represented by the AdaptationSet within which the VPCCComponent descriptor is present. If only one layer is present in the representations of the AdaptationSet, min_layer_index and max_layer_index shall have the same value. |
| component@max_layer_index | CM | xs:integer | Indicates the index of the last layer of the component represented by the AdaptationSet within which the VPCCComponent descriptor is present. Shall only be present if min_layer is present. If only one layer is present in the representations of the adaptation set, min_layer_index and max_layer_index shall have the same value. |

TABLE 5-continued

Elements and attributes for the VPCCComponent descriptor

| Elements and Attributes for VPCCComponent descriptor | Use | Data type | Description |
|---|---|---|---|
| component@attribute_type | CM | xs:unsignedByte | Indicates the type of the attribute (refer to Table 7.2 in the V-PCC CD. Only values between 0 and 15, inclusive, are allowed. Shall be present only if the component is a point cloud attribute (i.e., component_type has the value 'attr'). |
| component@attribute_index | CM | xs:unsignedByte | Indicates the index of the attribute. Shall be a value between 0 and 127, inclusive. Shall be present only if the component is a point cloud attribute (i.e., component_type has the value 'attr'). |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

The data types for the various elements and attributes of the VPCCComponent descriptor may be as defined in the following XML schema

```
<?xml version="1.0" encoding="UTF-B"?>
<xs:schema xmlns:xs="http//www.w3.org/2001/XMLSchema"
    targetNamespace="urn:mpegmpegl:vpcc:2019"
    xmlns:omaf="urn:mpeg:mpegl:wpcc:2019"
    elementFormDefault="qualified">
    <xs:element:name="component type="vppcc:vpccComponentType"/>
    <xs:complexType name="vpccComponentType">
        <xs:attribute name="component_type" type="xs:integer"
            use="required" />
        <xs:attribute name="min_layer_index" type="xs:integer"
            use="optional" />
        <xs:attribute name="max_layer_index" type="xs:integer" />
        <xs:attribute name="attribute_type" type="xs:unsignedByte" />
        <xs:attribute name="attribute_index" type="xs:unsignedByte" />
    </xs:complex Type>
</xs:schema>
```

In an embodiment, the main AdaptationSet shall contain either a single initialization segment at adaptation set level or multiple initialization segments at representation level (one for each Representation). In an embodiment, initialization segments should contain V-PCC sequence parameter sets, as defined in the community draft, which are used to initialize the V-PCC decoder. In the case of a single initialization segment, V-PCC sequence parameter sets for all Representations may be contained in the initialization segment. When more than one Representation is signaled in the main AdaptationSet, the initialization segment of each Representation may contain the V-PCC sequence parameter sets for that particular Representation. When ISO Base Media File Format (ISOBMFF) is used as a media container for V-PCC content, as defined in the WD of ISO/IEC 23090-10, initialization segments may also include a MetaBox, as defined in ISO/IEC 14496-12. This MetaBox contains one or more VPCCGroupBox instances, as defined in the VPCC CD, that provide metadata information describing the tracks at the file format level and the relationship between them.

In an embodiment, media segments for the Representations of the main AdaptationSet contain one or more track fragments of the V-PCC track, defined in the community draft. Media segments for the Representations of component AdaptationSets contain one or more track fragments of the corresponding component track at the file format level.

In another embodiment, an additional attribute, herein termed the @videoCodec attribute, is defined for the VPCC-Component descriptor, the value of which indicates the codec used for encoding the corresponding point cloud component. This enables supporting scenarios where more than one point cloud component is present in an AdaptationSet or Representation.

In another embodiment, the Role descriptor element may be used with newly defined values for V-PCC components to indicate the role of the corresponding AdaptationSet or Representation (e.g., geometry, occupancy map, or attribute). For example, geometry, occupancy map, and attribute components may have the following corresponding values, respectively: vpcc-geometry, vpcc-occupancy, and vpcc-attribute. An additional Essential Property descriptor element, similar to the one described in Table 5 minus the component_type attribute may be signaled at the adaptation set level to identify the layers of the component and the attribute type (if the component is a point cloud attribute).

Grouping V-PCC Adaptation Sets

A streaming client is able to identify the type of point cloud component in an AdaptationSet or Representation by checking the VPCCComponent descriptor within the corresponding element. However, a streaming client also needs to distinguish between different point cloud streams present in the MPD file and identify their respective component streams.

An EssentialProperty element with a @schemeIdUri attribute equal to "urn:mpeg:mpegl:vpcc:2019:vpc" may be introduced and is herein referred to as a VPCC descriptor. At most one VPCC descriptor may be present at the adaptation set level for the main AdaptationSet of the point cloud. If more than one Representation is present in the main AdaptationSet, then at most one VPCC descriptor may be present at the representation level (i.e., within each Representation element). Table 6 illustrates the attributes of a VPCC descriptor according to an embodiment.

TABLE 6

Attributes for the VPCC descriptor

| Attributes for VPCC descriptor | Use | Data type | Description |
| --- | --- | --- | --- |
| vpcc:@pcId | CM | xs:string | An id for the point cloud. This attribute shall be present if multiple versions of the same point cloud are signalled in separate AdapatationSets. |
| vpcc:@occupancyId | M | StringVectorType | The id of the point cloud occupancy map component's AdaptationSet or Representation. |
| vpcc:@geometryId | M | StringVectorType | A list of space separated identifiers corresponding to the values of the @id attribute for the point cloud geometry component AdaptationSets and/or Representations. |
| vpcc:@attributeId | M | StringVectorType | A list of space separated identifiers corresponding to the values of the @id attribute for the point cloud attribute components' AdaptationSets and/or Representations. |

When more than one version of the point cloud is available (e.g., different resolutions), each version may be present in a separate component AdaptationSet containing a single Representation and a VPCC descriptor with the same value for the @pcId attribute. In another embodiment, different versions of a point cloud may be signaled as Representations of a single (main) AdaptationSet. In such case, a VPCC descriptor shall be present in each Representation and the @pcId attribute may either be signaled with the same value for all Representations in the main AdaptationSet or omitted.

Figure 6:
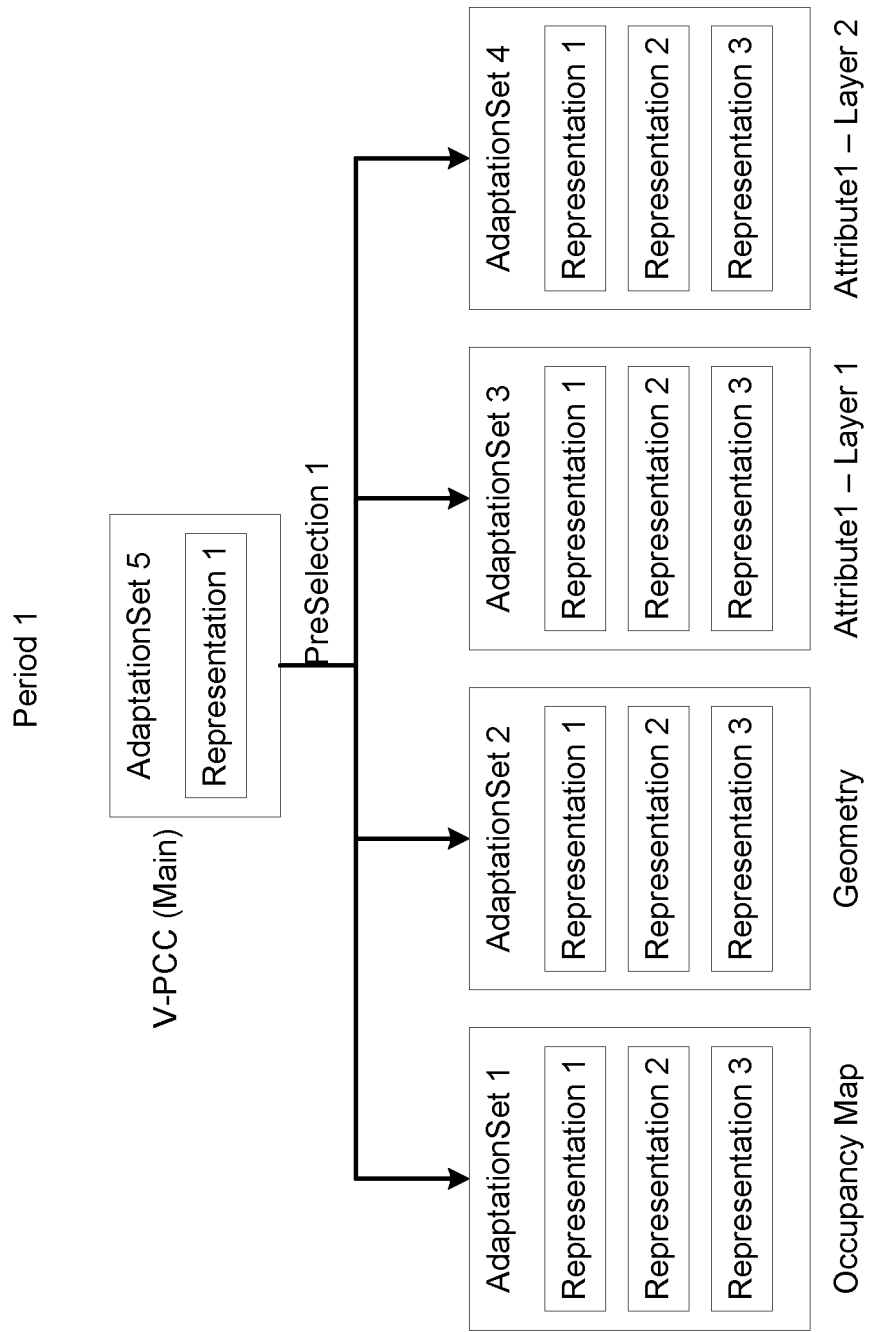
FIG. 6 illustrates an exemplary DASH configuration for grouping V-PCC components belonging to a single point cloud within an MPEG-DASH MPD file.

In another embodiment, a PreSelection is signaled in the MPD with the value of the @preselectionComponents attribute including the id of the main AdaptationSet for the point cloud followed by the ids of the component AdaptationSets corresponding to the point cloud components. The @codecs attribute for the PreSelection shall be set to 'vpc1', indicating that the PreSelection media is a video-based point cloud. The PreSelection may either be signaled using a PreSelection element within the Period element or a preselection descriptor at the adaptation set level (or representation level when multiple versions/representations are available for the same point cloud). When the PreSelection element is used and more than one version of the same point cloud is available, each version is signaled in a separate PreSelection element with the first id in the id list of the @preselectionComponents attribute being the id of the Representation of the corresponding point cloud version in the main AdaptationSet. FIG. 6 illustrates an exemplary DASH configuration for grouping V-PCC components belonging to a single point cloud within an MPEG-DASH MPD file.

Using a preselection descriptor, this grouping/association may be signaled as follows.

```
<Period>
  <AdaptionSet id="5| codecs="vpc1">
    <SupplementalProperty schemeIdUri="urn:mpeg:dash:preselection:
    2016" value="Presel1,5 1 2 3 4"/>
    <Representation>
    . . .
    </Representation>
  </AdaptationSet>
</Period>
```

In another embodiment, the main AdaptationSet of the point cloud, or its Representation(s), may list the identifiers of the components' AdaptationSets and/or Representations using the @associationId attribute defined in ISO/IEC 23009-1 with @associationType values being set to the 4CC of V-PCC (i.e., 'vpc1').

In another embodiment, the main AdaptationSet of the point cloud, or its Representation(s), may list the identifiers of the components' AdaptationSets and/or Representations using the @dependencyId attribute defined in ISO/IEC 23009-1. This is because there is an inherent dependency since segments in the main AdaptationSet need to be decoded in conjunction with segments from the component AdaptationSets of the point cloud components in order to reconstruct the point cloud.

Signaling Component Metadata

Geometry and attribute metadata are normally used for rendering. They are signaled within the parameter sets of the V-PCC bitstream. However, it may be necessary to signal these metadata elements in the MPD so that the streaming client can obtain the information as early as possible. In addition, the streaming client may make selection decisions between multiple versions of the point cloud with different geometry and attribute metadata values (e.g., based on whether the client supports the signaled values or not).

Signaling Geometry Metadata

A SupplementalProperty element with a @schemeIdUri attribute equal to "urn:mpeg:mpegI:vpcc:2019:geom_meta" may be introduced and is herein referred to as a geometry metadata descriptor or geoMeta descriptor. At most, one geomMeta descriptor may be present at the MPD level, in which case it is applicable to geometry components for all point clouds signaled in the MPD, unless overridden by a geoMeta descriptor at a lower level as discussed below. At most, one geomMeta descriptor may be present at the adaptation set level in the main AdaptationSet. At most, one geomMeta descriptor may be present at the representation level in the main AdaptationSet. If a geomMeta descriptor is present at a certain level, it overrides any geomMeta descriptor signaled at a higher level.

In an embodiment, the @value attribute of the geomMeta descriptor shall not be present. In an embodiment, the geomMeta descriptor includes the elements and attributes specified in Table 7.

TABLE 7

Elements and attributes for the geomMeta descriptor

| Elements and attributes for geomMeta descriptor | Use | Data type | Description |
|---|---|---|---|
| geom | 0 . . . 1 | vpcc:geometryMetadataType | Container element whose attributes and elements specify geometry metadata information. |
| geom@point_shape | O | xs:unsignedByte | Indicates the geometry point shape to be used for rendering. Supported values are in the range 0 to 15, inclusive. The corresponding shape is derived from Table 7-2 in the community draft. If not present, the default value shall be 0. |
| geom@point_size | O | xs:unsignedShort | Indicates the geometry point size to be used for rendering. Supported values are in the range 1 to 65535, inclusive. If not present, the default value shall be 1. |
| geom.geomSmoothing | 0 . . . 1 | vpcc:geometrySmoothingType | Element whose attributes provide geometry smoothing information. |
| geom.geomSmoothing@grid_size | M | xs:unsignedByte | Specifies the grid size for geometry smoothing. Allowed values shall be in the range 2 to 128, inclusive. If a geom.geomSmoothing element is not present, the default grid size shall be inferred to be 8. |
| geom.geomSmoothing@threshold | M | xs: unsignedByte | The smoothing threshold. If a geom.geomSmoothing element is not present, the default threshold shall be inferred to be 64. |
| geom.geomScale | 0 . . . 1 | vpcc:geometryScaleType | Element whose attributes provide geometry scaling information. |
| geom.geomScale@x | M | xs:unsignedInt | The value of the scale along the X axis. If a geom.geomSmoothing element is not present, the default value shall be inferred to be 1. |
| geom.geomScale@y | M | xs:unsignedInt T | he value of the scale along the Y axis. If a geom.geomSmoothing element is not present, the default value shall be inferred to be 1. |
| geom.geomScale@z | M | xs:unsignedInt | The value of the scale along the Z axis. If a geom.geomSmoothing element is not present, the default value shall be inferred to be 1. |
| geom.geomOffset | 0 . . . 1 | vpcc:GeometryOffsetType | Element whose attributes provide geometry offsetting information. |
| geom.geomOffset@x | M | xs:int | The value of the offset along the X axis. If a geom.geomSmoothing element is not present, the default value shall be inferred to be 0. |
| geom.geomOffset@y | M | xs:int | The value of the offset along the Y axis. If a geom.geomSmoothing element is not present, the default value shall be inferred to be 0. |
| geom.geomOffset@z | M | xs:int | The value of the offset along the Z axis. If a geom.geomSmoothing element is not present, the default value shall be inferred to be 0. |
| geom.geomRotation | 0 . . . 1 | vpcc:geometryRotationType | Element whose attributes provide geometry rotation information. |
| geom.geomRotation@x | M | xs:int | The value of the rotation along the X axis in units of $2^{-16}$ degrees. If a geom.geomSmoothing element is not present, the default value shall be inferred to be 0. |
| geom.geomRotation@y | M | xs:int | The value of the rotation along the Y axis in units of $2^{-16}$ degrees. If a geom.geomSmoothing element is not present, the default value shall be inferred to be 0. |

TABLE 7-continued

Elements and attributes for the geomMeta descriptor

| Elements and attributes for geomMeta descriptor | Use | Data type | Description |
|---|---|---|---|
| geom.geomRotation@z | M | xs:int | The value of the rotation along the Z axis in units of $2^{-16}$ degrees. If a geom.geomSmoothing element is not present, the default value shall be inferred to be 0. |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

In an embodiment, the data types for the various elements and attributes of the geomMeta descriptor may be as defined in the following XML schema.

```
<?xml version="1.0" encoding="UTF-8"?>
<xs:schema xmlns:xs="http://www.w3.org/2001/XMLSchema"
  targetNamespace="urn:mpeg:mpegI:vpcc:2019"
  xmlns:omaf="urn:mpeg:mpegI:vpcc:2019"
  elementFormDefault="qualified">
  <xs:element name="geom" type="vpcc:geometryMetadataType"/>
  <xs:complexType name="geometryMetadataType">
    <xs:attribute name="point_shape" type="xs:unsignedShort" use="optional" default="0" />
    <xs:attribute name="point_size" type="xs:unsignedByte" use="optional" default="1" />
    <xs:element name="geomSmoothing" type="vpcc:geometrySmoothingType" minOccurs="0" maxOccurs="1"/>
    <xs:element name="geomScale" type="vpcc:geometryScaleType" minOccurs="0" maxOccurs="1"/>
    <xs:element name="geomOffset" type="vpcc:geometryOffsetType" minOccurs="0" maxOccurs="1"/>
    <xs:element name="geomRotation" type="vpcc:geometryRotationType" minOccurs="0" maxOccurs="1"/>
  </xs:complexType>
  <xs:complexType name="geometrySmoothingType">
    <xs:attribute name="grid_size" type="xs:unsignedByte" use="required" />
    <xs:attribute name="threshold" type="xs:unsignedByte" use="required" />
  </xs:complexType>
  <xs:complexType name="geometryScaleType">
    <xs:attribute name="x" type="xs:unsignedInt" use="required" />
    <xs:attribute name="y" type="xs:unsignedInt" use="required" />
    <xs:attribute name="z" type="xs:unsignedInt" use="required" />
  </xs:complexType>
  <xs:complexType name="geometryOffsetType">
    <xs:attribute name="x" type="xs:int" use="required" />
    <xs:attribute name="y" type="xs:int" use="required" />
    <xs:attribute name="z" type="xs:int" use="required" />
  </xs:complexType>
  <xs:complexType name="geometryRotationType">
    <xs:attribute name="x" type="xs:int" use="required" />
    <xs:attribute name="y" type="xs:int" use="required" />
    <xs:attribute name="z" type="xs:int" use="required" />
  </xs:complexType>
</xs:schema>
```

Signaling Attribute Metadata

A SupplementalProperty element with a @schemeIdUri attribute equal to "urn:mpeg:mpegI:vpcc:2019:attr_meta" may be introduced and is herein referred to as an attribute metadata descriptor or attrMeta descriptor. At most one attrMeta descriptor may be present at adaptation set level in the main AdaptationSet. At most one attrMeta descriptor may be present at representation level in the main AdaptationSet. If an attrMeta descriptor is present at the representation level, it overrides any attrMeta descriptor signaled at the adaptation set level for the AdaptationSet to which the Representation belongs.

In an embodiment, the @value attribute of the attrMeta descriptor is not present. In an embodiment, the attrMeta descriptor may include elements and attributes as specified in Table 8.

TABLE 8

Elements and attributes for the attrMeta descriptor

| Elements and attributes for attrMeta descriptor | Use | Data type | Description |
|---|---|---|---|
| attm | 0 ... N | vpcc:attributeMetadataType | Container element whose attributes and elements specify metadata information for a point cloud attribute. |
| attm@index | M | xs:unsignedByte | Indicates the index of the attribute. Shall be a value between 0 and 127, inclusive. |
| attm@num_dimensions | M | xs:unsignedByte | The number of dimensions for the point cloud attribute. |
| attm.attrSmoothing | 0 ... 1 | vpcc:attributeSmoothingType | Element whose attributes provide smoothing information for the point cloud attribute. |
| attm.attrSmoothing@radius | M | xs:unsignedByte | The radius to detect neighbours for attribute smoothing. If a attm.attmSmoothing element is not present, the default value shall be inferred to be 0. |
| attm.attrSmoothing@neighbor_count | M | xs:unsignedByte | The maximum number of neighbouring points used for attribute smoothing. If a attm.attmSmoothing element is not present, the default value shall be inferred to be 0. |
| attm.attrSmoothing@radius2_boundary | M | xs:unsignedByte | The radius for boundary point detection. If a attm.attmSmoothing element is not present, the default value shall be inferred to be 0. |
| attm.attrSmoothing@threshold | M | xs:unsignedByte | The attribute smoothing threshold. If a attm.attmSmoothing element is not present, the default value shall be inferred to be 0. |
| attm.attrSmoothing@threshold_local_entropy | M | xs:unsignedByte | The local entropy threshold in the neighbourhood of a boundary point. Values for this attribute shall be in the range 0 to 7, inclusive. If a attm.attmSmoothing element is not present, the default value shall be inferred to be 0. |
| attm.attrScale | 0 ... 1 | vpcc:attributeScaleType | Element whose attribute provides scaling information along each dimension of the point cloud attribute. |
| attm.attrScale@values | M | xs:string | A string of comma-separated scale values for each dimension of the point cloud attribute. |
| attm.attrOffset | 0 ... 1 | vpcc:attributeOffsetType | Element whose attribute provides offset information along each dimension of the point cloud attribute. |
| attm.attrOffset@values | M | xs:string | A string of comma-separated offset values for each dimension of the point cloud attribute. |

Legend:
For attributes: M = Mandatory, O = Optional, OD = Optional with Default Value, CM = Conditionally Mandatory.
For elements: <minOccurs> ... <maxOccurs> (N = unbounded)
Elements are bold; attributes are non-bold and preceded with an @.

In an embodiment, the data types for the various elements and attributes of the attrMeta descriptor may be as defined in the following XML schema.

```xml
<?xml version="1.0" encoding="UTF-8"?>
<xs:schema xmlns:xs="http://www.w3.org/2001/XMLSchema"
   targetNamespace="urn:mpeg:mpegI:vpcc:2019"
   xmlns:omaf="urn:mpeg:mpegI:vpcc:2019"
   elementFormDefault="qualified">
   <xs:element name="attm" type="vpcc:attributeMetadataType"/>
   <xs:complexType name="attributeMetadataType">
      <xs:attribute name="index" type="xs:unsignedByte" use="required" />
      <xs:attribute name="num_dimension" type="xs:unsignedByte" use="required" />
      <xs:element name="attrSmoothing" type="vpcc:attributeSmoothingType" minOccurs="0" maxOccurs="1"/>
      <xs:element name="attrScale" type="vpcc:attributeScaleType" minOccurs="0" maxOccurs="1"/>
      <xs:element name="attrOffset" type="vpcc:attributeOffsetType" minOccurs="0" maxOccurs="1"/>
   </xs:complexType>
   <xs:complexType name="attributeSmoothingType">
      <xs:attribute name="radius" type="xs:unsignedByte" use="required" />
      <xs:attribute name="neighbour_count" type="xs:unsignedByte" use="required" />
      <xs:attribute name="radius2_boundary" type="xs:unsignedByte" use="required" />
      <xs:attribute name="threshold" type="xs:unsignedByte" use="required" />
      <xs:attribute name="threshold_local_entropy" type="xs:unsignedByte" use="required" />
   </xs:complexType>
```

```
<xs:complexType name="attributeScaleType">
  <xs:attribute name="values" type="xs:string" use="required" />
</xs:complexType>
<xs:complexType name="attributeOffsetType">
  <xs:attribute name="values" type="xs:string" use="required" />
</xs:complexType>
</xs:schema>
```

Streaming Client Behavior

Figure 7:
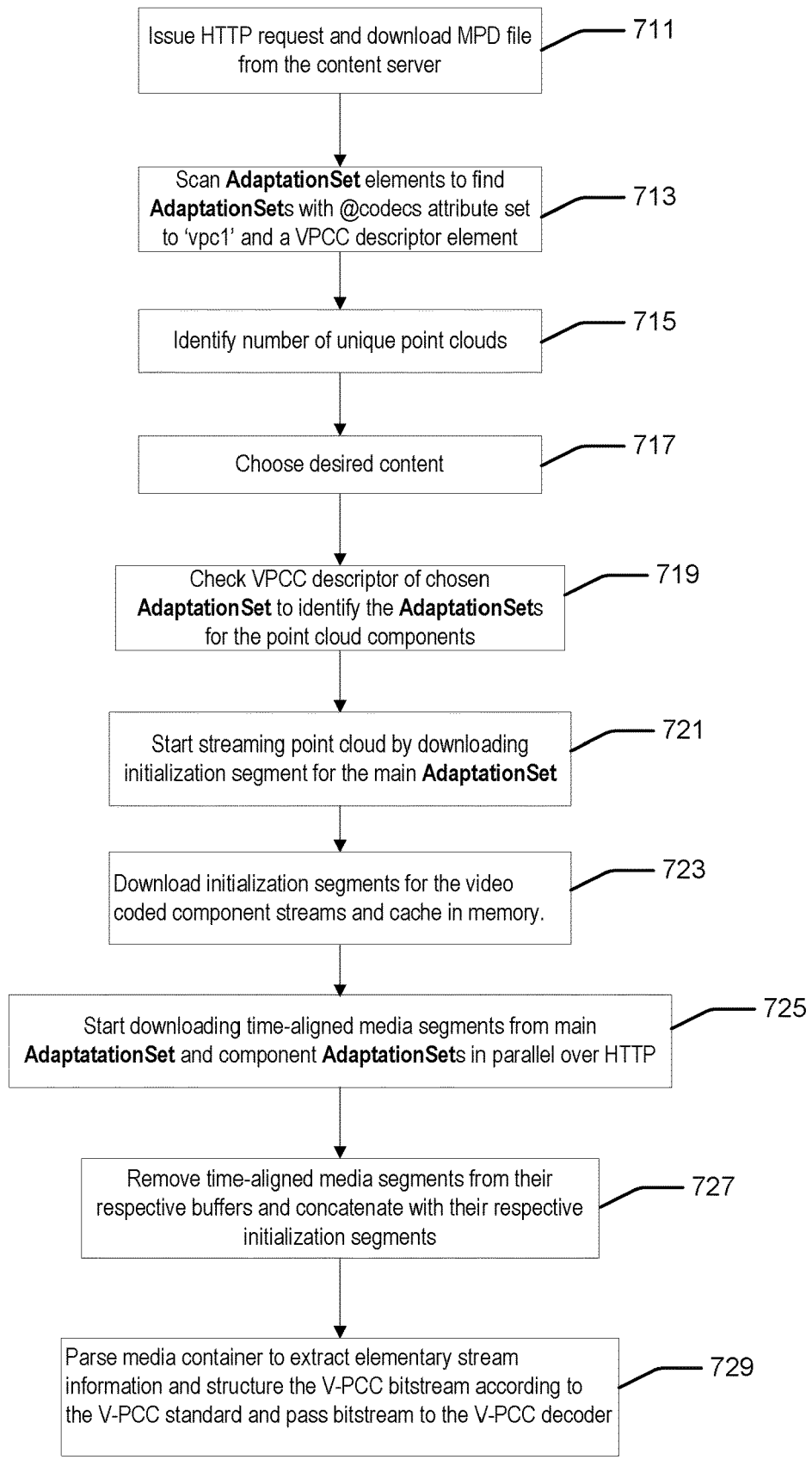
FIG. 7 is a flow diagram illustrating an exemplary decoder process for streaming point cloud content in accordance with an embodiment.

A DASH client (a decoder node) is guided by the information provided in the MPD. The following is an example client behavior for processing streaming point cloud content in accordance with the signaling presented in this specification, assuming an embodiment in which association of component AdaptationSets to the main point cloud AdaptationSet is signaled using the VPCC descriptor. FIG. 7 is a flow diagram illustrating an exemplary streaming client process in accordance with an embodiment.

At 711, the client first issues an HTTP request and downloads the MPD file from the content server. The client then parses the MPD file to generate a corresponding in-memory representation of the XML elements in the MPD file.

Next, at 713, to identify available point cloud media content in a Period, the streaming client scans the AdaptationSet elements to find AdaptationSets with @codecs attribute set to 'vpc1' and a VPCC descriptor element. The resulting subset is a set of main AdaptationSets for point cloud content.

Next, at 715, the streaming client identifies the number of unique point clouds by checking the VPCC descriptors of those AdaptationSets and groups AdaptationSets with the same @pcId value in their VPCC descriptor as versions of the same content.

At 717, the group of AdaptationSet with @pcId value corresponding to the point cloud content that the user wishes to stream is identified. If the group contains more than one AdaptationSet, the streaming client selects the AdaptationSet with a supported version (e.g., video resolution). Otherwise, the group's sole AdaptationSet is chosen.

Next, at 719, the streaming client checks the VPCC descriptor of the chosen AdaptationSet to identify the AdaptationSets for the point cloud components. These are identified from the values of the @occupancyId, @geometryId, and @attributeId attributes. If geomMeta and/or attrMeta descriptors are present in the chosen main AdaptationSet, the streaming client is able to identify whether it supports the signaled rendering configuration for the point cloud stream before downloading any segments. Otherwise, the client needs to extract this information from the initialization segment.

Next, at 721, the client starts streaming the point cloud by downloading the initialization segment for the main AdaptationSet which contains the parameter sets needed for initializing the V-PCC decoder.

At 723, initialization segments for the video coded component streams are downloaded and cached in memory.

At 725, the streaming client then starts downloading time-aligned media segments from the main AdaptatationSet and component AdatptationSets in parallel over HTTP and the downloaded segments are stored in an in-memory segment buffer.

At 727, time-aligned media segments are removed from their respective buffers and concatenated with theft respective initialization segments.

Finally, at 729, the media container (e.g., ISOBMFF) is parsed to extract the elementary stream information and structure the V-PCC bitstream according to the V-PCC standard and the bitstream is then passed to the V-PCC decoder Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed", "computer executed", or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B". Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to", "at least", "greater than", "less than", and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112(f) or means-plus-function claim format, and any claim without the terms "means for" is not so intended.

Although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed", "computer executed", or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. In addition, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 112(f), and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WRTU), user equipment (UE), terminal, base station, Mobility Management Entity (MME) or Evolved Packet Core (EPC), or any host computer. The WRTU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A network node, comprising circuitry including any of a transmitter, a receiver, a processor and memory, for streaming point cloud (PC) data (PCD) corresponding to a PC via a network using Hyper-Text Transfer Protocol (HTTP) and including a plurality of Video-based Point Cloud Compression (V-PCC) components comprising the PC, the network node configured to:

generate information associated with the PCD of the PC in a Dynamic Adaptive Streaming of HTTP (DASH) Media Presentation Description (MPD), wherein the generated information in the DASH MPD indicates at least:

(1) a main Adaptation Set (AS) for the PC, wherein the main AS includes information indicating at least: (i) a value for a codec attribute signifying that the main AS corresponds to V-PCC data, and (ii) an initialization segment containing at least one V-PCC sequence parameter set for a representation of the PC, and (2) a plurality of component ASs, wherein each of the plurality of component ASs corresponds to one of the plurality of V-PCC components and includes information indicating at least: (a) a V-PCC Component descriptor identifying a type of the corresponding V-PCC component, wherein the type comprises geometry, occupancy, or attribute, and (b) at least one property of the corresponding V-PCC component; and transmit the DASH MPD over the network.

2. The network node of claim 1 configured to transmit the PCD over the network, wherein, an International Organization for Standardization (ISO) Base Media File Format (ISOBMFF) is used as a media container for the V-PCC content, and wherein, the initialization segment of the main AS includes a MetaBox containing one or more V-PCC GroupBox instances providing metadata information associated with V-PCC tracks.

3. The network node of claim 1, wherein the initialization segment of the main AS includes information indicating: (1) a single initialization segment at adaptation level, and (2) V-PCC sequence parameter sets for all representations of the main AS.

4. The network node of claim 1, wherein the main AS includes information indicating an initialization segment for each of multiple representations of the PC,
- wherein each initialization segment that corresponds to a representation of the PC includes a V-PCC sequence parameter set for that representation.

5. The network node of claim 1, wherein the VPCC Component descriptor includes information indicating a video codec attribute for a codec used for encoding a corresponding V-PCC component.

6. The network node of claim 1, wherein the AS includes information indicating a role descriptor DASH element having a value indicating one of geometry, occupancy map, or attribute of the corresponding component.

7. The network node of claim 1, wherein the VPCC Component descriptor information identifies any of layers of the corresponding V-PCC component or an attribute type of the corresponding V-PCC component.

8. The network node of claim 1, wherein the main AS indicates a VPCC descriptor for a particular point cloud to which the main AS corresponds, and identifiers associated with the plurality of component ASs.

9. The network node of claim 8, further configured to, on condition that the V-PCC data for the PC includes more than one version of the PC, signal each version of the PC in separate main ASs respectively containing a single representation corresponding to the version of the PC and a respective VPCC descriptor, wherein all separate main ASs corresponding to different versions of the PC have a same value for a PC identifier (ID) attribute.

10. The network node of claim 8, further configured to signal different versions of the PC as different representations of the main AS,
- wherein a respective V-PCC descriptor is present for each representation of the main AS, and
- wherein the PC ID attribute is any of: (1) present in each representation and signaled with the same value for all representations in the main AS, or (2) omitted.

11. The network node of claim 8, wherein the DASH MPD includes preselection information indicating a value of an attribute including an identifier (ID) of the main AS for the PC, and the IDs associated with the plurality of component ASs corresponding to PC components,
- wherein the attribute is a preselectioncomponents attribute,
- wherein more-than-one version of the same PC is available,
- wherein each of the more-than-one version is signaled in a respective PreSelection element, and
- wherein a first ID in an ID list of the preselectionComponents attribute is an ID of a representation of a corresponding one of the more-than-one version of the same PC in the main AS.

12. The network node of claim 8, wherein the main AS of the PC includes information indicating a list of IDs of component ASs in an association ID attribute, wherein a value of association type attribute is set to a 4CC of the V-PCC.

13. The network node of claim 8, wherein the main AS of the PC includes information indicating a list of IDs of any of the component ASs using a dependency ID attribute.

14. The network node of claim 1, wherein the DASH MPD includes information indicating at least one of geometry metadata and attribute metadata for the PC.

15. The network node of claim 14, wherein the information indicating the geometry metadata is included in a scheme ID universal resource indicator (URI) attribute.

16. The network node of claim 14, wherein the information indicating the attribute metadata is included in a scheme ID universal resource indicator (URI) attribute.

17. A method for a network node streaming point cloud (PC) data (PCD) corresponding to a PC via a network using Hyper-Text Transfer Protocol (HTTP) and including a plurality of Video-based PC Compression (V-PCC) components comprising the PC, the method comprising:
- generating information associated with the PCD of the PC in a Dynamic Adaptive Streaming of HTTP (DASH) Media Presentation Description (MPD), wherein the generated information in the DASH MPD indicates at least:
  (1) a main Adaptation Set (AS) for the point cloud, wherein the main AS includes information indicating at least: (i) a unique value for a codec attribute signifying that the main AS corresponds to V-PCC data, (ii) an initialization segment containing at least one V-PCC sequence parameter set for a representation of the PC, and
  (2) a plurality of component ASs, wherein each of the plurality of component ASs corresponds to one of the plurality of V-PCC components and includes information indicating at least: (a) a V-PCC Component descriptor identifying a type of the corresponding V-PCC component, wherein the type comprises geometry, occupancy, or attribute, and (b) at least one property of the corresponding V-PCC component; and
- transmitting the DASH MPD over the network.

18. The method of claim 17, further comprising transmitting the PCD over the network,
- wherein an International Organization for Standardization (ISO) Base Media File Format (ISOBMFF) is used as a media container for the V-PCC content, and
- wherein, in the initialization segment of the main AS, a MetaBox containing one or more VPCCGroupBox instances providing metadata information associated with V-PCC tracks.

19. The method of claim 17, wherein the initialization segment of the main AS includes information indicating a single initialization segment at adaptation level, the single initialization segment including V-PCC sequence parameter sets for all representations of the main AS.

20. The method of claim 17, wherein the main AS includes information indicating an initialization segment for each of multiple representations of the PC,
- wherein each initialization segment that corresponds to a representation of the PC includes a V-PCC sequence parameter set for that representation.

* * * * *

UNITED STATES PATENT AND TRADEMARK OFFICE
CERTIFICATE OF CORRECTION

PATENT NO. : 12,041,104 B2
APPLICATION NO. : 17/436891
DATED : July 16, 2024
INVENTOR(S) : Ahmed Hamza and Yong He Page 1 of 1

It is certified that error appears in the above-identified patent and that said Letters Patent is hereby corrected as shown below:

In the Claims

In Claim 17: Column 38, Line 12, delete "fora", and insert -- for a --

Signed and Sealed this
Eighth Day of April, 2025

Coke Morgan Stewart
*Acting Director of the United States Patent and Trademark Office*